US010562192B2

(12) United States Patent
Azzarello et al.

(10) Patent No.: US 10,562,192 B2
(45) Date of Patent: Feb. 18, 2020

(54) WINDOW CLEANING SYSTEM AND METHOD

(71) Applicant: GED Integrated Solutions, Inc., Twinsburg, OH (US)

(72) Inventors: Scott M. Azzarello, Garfield Heights, OH (US); Timothy B. McGlinchy, Twinsburg, OH (US); Dave Lewis, Hudson, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 1019 days.

(21) Appl. No.: 14/472,963

(22) Filed: Aug. 29, 2014

(65) Prior Publication Data

US 2015/0063936 A1    Mar. 5, 2015

Related U.S. Application Data

(60) Provisional application No. 61/871,720, filed on Aug. 29, 2013.

(51) Int. Cl.
*B23P 23/02*     (2006.01)
*B25J 9/06*      (2006.01)
(Continued)

(52) U.S. Cl.
CPC .......... *B25J 15/0066* (2013.01); *B23C 3/128* (2013.01); *B23D 45/003* (2013.01); *B23D 79/02* (2013.01);
(Continued)

(58) Field of Classification Search
CPC . B23C 3/128; B23C 3/12; Y10T 409/304256; Y10T 29/5152–5167;
(Continued)

(56) References Cited

U.S. PATENT DOCUMENTS 4,590,578 A * 5/1986 Barto, Jr. ................. B21J 15/10
                                                  318/632
4,909,892 A    3/1990 Quinn et al.
(Continued)

FOREIGN PATENT DOCUMENTS

DE         4109749 A1 * 10/1991
DE    102006007171 A1 *  8/2007
(Continued)

OTHER PUBLICATIONS

Mexican Office Action for PCT national phase Patent Aplication No. MX/z/2016/002617 dated Aug. 6, 2019 (3 pages).*
(Continued)

*Primary Examiner* — Erica E Cadugan
(74) *Attorney, Agent, or Firm* — John A. Yirga, Esq.; Tarolli, Sundheim, Covell & Tummino LLP

(57) ABSTRACT

A window processing system and method for use in fabricating window frames or sashes. The system includes an articulating arm having a plurality of members and arms to allow movement about multiple axes defined by the articulating arm. The system further includes a tool support fixture assembly coupled to an outermost member of the plurality of members, the tool support fixture assembly includes a plurality of tools for performing cleaning operations on a window frame or sash during use.

16 Claims, 24 Drawing Sheets

(51) Int. Cl.
| | |
|---|---|
| B25J 11/00 | (2006.01) |
| B25J 19/02 | (2006.01) |
| B23D 79/02 | (2006.01) |
| B23D 45/00 | (2006.01) |
| B23C 3/12 | (2006.01) |
| B25J 15/00 | (2006.01) |
| B24B 27/04 | (2006.01) |
| B29C 37/04 | (2006.01) |
| B25J 13/08 | (2006.01) |
| B25J 9/16 | (2006.01) |
| B23P 25/00 | (2006.01) |

(52) U.S. Cl.
CPC .............. *B23P 23/02* (2013.01); *B24B 27/04* (2013.01); *B25J 9/1697* (2013.01); *B25J 11/006* (2013.01); *B25J 13/087* (2013.01); *B25J 15/0057* (2013.01); *B29C 37/04* (2013.01); *B23P 25/006* (2013.01); *B25J 9/06* (2013.01); *Y10S 901/41* (2013.01); *Y10T 29/5107* (2015.01); *Y10T 29/519* (2015.01); *Y10T 29/5168* (2015.01); *Y10T 29/5182* (2015.01); *Y10T 409/303808* (2015.01); *Y10T 409/304256* (2015.01)

(58) Field of Classification Search
CPC .... Y10T 29/519; Y10T 408/37; B25J 11/006; B25J 15/0066; B25J 15/0057; B29C 37/04; B23B 29/24–34; B23B 39/20; B23B 39/205; B23Q 2039/004; B23Q 2220/002
USPC ......... 409/140; 29/26 R, 26 A, 35.5–48.5 A, 29/33 J; 408/35
See application file for complete search history.

(56) References Cited

U.S. PATENT DOCUMENTS

| | | | | |
|---|---|---|---|---|
| 4,971,639 | A | 11/1990 | Quinn et al. | |
| 5,298,844 | A * | 3/1994 | Nagasaki | B23Q 1/4857 29/26 A |
| 5,655,247 | A | 8/1997 | Allen et al. | |
| 5,720,090 | A * | 2/1998 | Dawson, Jr. | B23B 29/242 29/35.5 |
| 6,250,174 | B1 * | 6/2001 | Terada | B25J 9/047 414/918 |
| 7,354,227 | B2 * | 4/2008 | Ramnauth | B23P 23/02 29/33 K |
| 7,784,161 | B2 * | 8/2010 | Eisenbach | B23B 39/24 29/26 A |
| 7,921,064 | B2 | 4/2011 | McGlinchy et al. | |
| 7,954,216 | B2 * | 6/2011 | Sturm | B23B 39/16 144/35.1 |
| 8,250,023 | B2 | 8/2012 | Mcglinchy et al. | |
| 10,414,051 | B2 * | 9/2019 | McGlinchy | B25J 11/006 |
| 2003/0099522 | A1 | 5/2003 | Laempe | |
| 2006/0236840 | A1 | 10/2006 | McGlinchy et al. | |
| 2008/0083193 | A1 | 4/2008 | McGlinchy | |
| 2011/0204102 | A1 * | 8/2011 | Suhara | B05B 1/636 239/436 |
| 2012/0054972 | A1 | 3/2012 | McGlinchy et al. | |
| 2012/0283519 | A1 | 10/2012 | Kotula | |
| 2016/0176055 | A1 * | 6/2016 | McGlinchy | B25J 11/006 700/160 |
| 2018/0333790 | A1 * | 11/2018 | Urban | B23D 45/003 |

FOREIGN PATENT DOCUMENTS

| | | |
|---|---|---|
| EP | 0909602 | 4/1999 |
| EP | 978339 A2 * | 2/2000 |
| EP | 1099522 A2 * | 5/2001 |
| FR | 2875165 A1 | 9/2013 |
| JP | 07-124848 A * | 5/1995 |
| WO | WO 2006/030084 | 3/2006 |
| WO | WO 2006/030084 A1 | 3/2006 |
| WO | WO 2016/081237 | 5/2016 |

OTHER PUBLICATIONS

International Search Report dated Feb. 25, 2016 and Written Opinion of the International Searching Authority dated Feb. 25, 2016 for PCT International Application No. PCT/US2015/060110, filed Nov. 11, 2015. PCT International Application No. PCT/US2015/060110 corresponds to and claims priority from U.S. Appl. No. 62/081,220, filed Nov. 18, 2014 and U.S. Appl. No. 14/937,168, filed Nov. 10, 2015. (4 pages).

International Search Report dated Dec. 24, 2014 and Written Opinion of the International Searching Authority dated Dec. 24, 2014 for PCT International Application No. PCT/US2014/053478, filed Aug. 29, 2014. PCT International Application No. PCT/US2014/053478 corresponds to and claims priority from U.S. Appl. No. 61/871,720, filed Aug. 29, 2013. (10 pages).

Supplementary European Search Report for corresponding patent application No. EP14849338, dated Apr. 24, 2017.

English Translation of French Patent Publication No. 2,875,165 (11 pages).

Data Sheet for IRB 140 Industrial Robot sold by ABB Manufacturing. Copyright Jan. 2014 (2 pages).

* cited by examiner

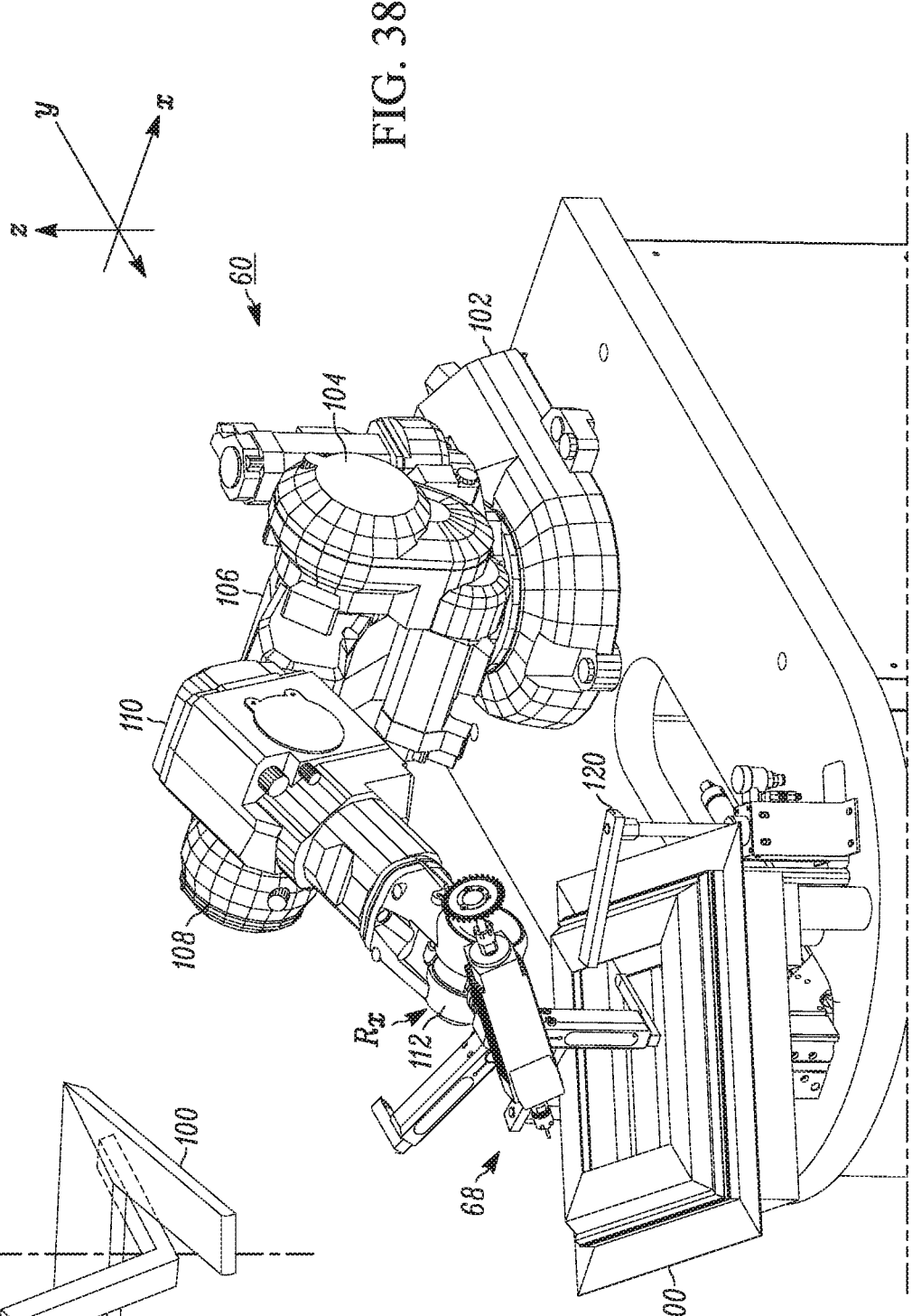
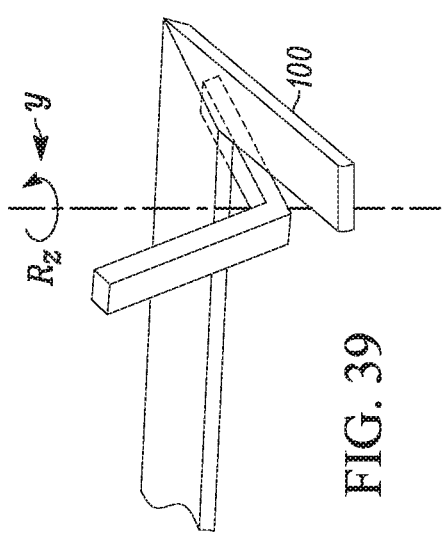

WINDOW CLEANING SYSTEM AND METHOD

CROSS REFERENCES TO RELATED APPLICATIONS

The following application claims priority under 35 U.S.C. 119(e) to U.S. Provisional Patent Application Ser. No. 61/871,720 filed Aug. 29, 2013 entitled WINDOW CLEANING SYSTEM AND METHOD. The above-identified application is incorporated herein by reference in its entirety for all purposes.

TECHNICAL FIELD

The present disclosure relates to a window cleaning system and method, and more particularly, a window cleaning system and method having flexible tool utilization and product recognition for cleaning or finishing window frames and/or sashes.

BACKGROUND

Plastic components that make a window frame or sash are typically welded together by miter cutting the components to size, heating the mitered ends and then pressing the heated ends together so that the melted ends bond to each other. This process often squeezes some of the material out from between the two pieces, which creates a bead of material, commonly referred to as weld flash, requiring further processing to obtain better appearance as well as removing material which may interfere with further assembly of the window itself such as installing an insulating glass unit (IGU) into a sash or a sash into a frame.

Further processing can be accomplished using a corner cleaner, a machine that removes the weld flash by means of multiple types of tools such as saw blades, knives, end mills or router bits to cut or abrade away the weld flash where it is not desired. Variances in the dimensions of the profile material and/or misalignment of the two parts during the welding process hamper the ability of the machine to consistently remove the weld flash to controlled dimensions due to profile dimensions changing in the frame extrusion.

Discussion of such cleaning issues and advancements are found in U.S. Pat. Nos. 7,921,064 and 8,250,023 to McGlinchy et al. These McGlinchy et al. patents are assigned to the assignee of the present invention and are incorporated herein by reference.

U.S. Pat. No. 4,909,892 to Quinn et al concerns an apparatus for simultaneously welding two or more pairs of thermoplastic frame elements. U.S. Pat. No. 4,971,639 to Quinn et al, concerns a method and apparatus for welding vinyl window and door frames. These Quinn et al patents are assigned to the assignee of the present invention and are incorporated herein by reference.

SUMMARY

One example embodiment of the present disclosure includes a window processing system method for use in fabricating window frames or sashes. The system includes an articulating arm having a plurality of members and arms to allow movement about multiple axes defined by the articulating arm. The system further includes a tool support fixture assembly coupled to an outermost member of the plurality of members, the tool support fixture assembly includes a plurality of tools for performing cleaning operations on a window frame or sash during use.

Another example embodiment of the present disclosure comprises an apparatus for cleaning a window frame or sash. The apparatus comprises a frame member for supporting the window frame or sash during cleaning. The apparatus also comprises an articulating robot having a plurality of members and arms to allow selective movement about multiple axes defined by at least one program. The program is stored in a programmable controller in communication with the articulating robot. The controller further being in communication with at least one sensor for identifying characteristics of a window frame during use. The apparatus also includes a tool support fixture assembly coupled to an outermost member of the plurality of members, the tool support fixture assembly has a plurality of tools for performing cleaning operations on a window frame or sash during use.

Yet another example embodiment of the present disclosure includes method for fabricating window frames or sashes. The method comprises the steps of articulating an arm assembly through the rotation and translation of a plurality of members and arms to allow movement about multiple axes defined by the arm assembly. The method also includes providing a tool support fixture assembly coupled to an outermost member of the plurality of members, the tool support fixture assembly supporting a plurality of tools. The method further comprises performing cleaning operations on a window frame or a sash by manipulating the tool support fixture and supported plurality of tools by the articulating of the arm assembly.

BRIEF DESCRIPTION OF THE DRAWINGS

The foregoing and other features and advantages of the present disclosure will become apparent to one skilled in the art to which the present invention relates upon consideration of the following description of the invention with reference to the accompanying drawings, wherein like reference numerals refer to like parts unless described otherwise throughout the drawings and in which:

FIG. 38 is a cleaning station illustrating a first tool path for cleaning;

FIG. 39 is a magnified view of the cleaning station of FIG. 38 illustrating a second tool path in accordance with another example embodiment of the present disclosure;

Figure 1:
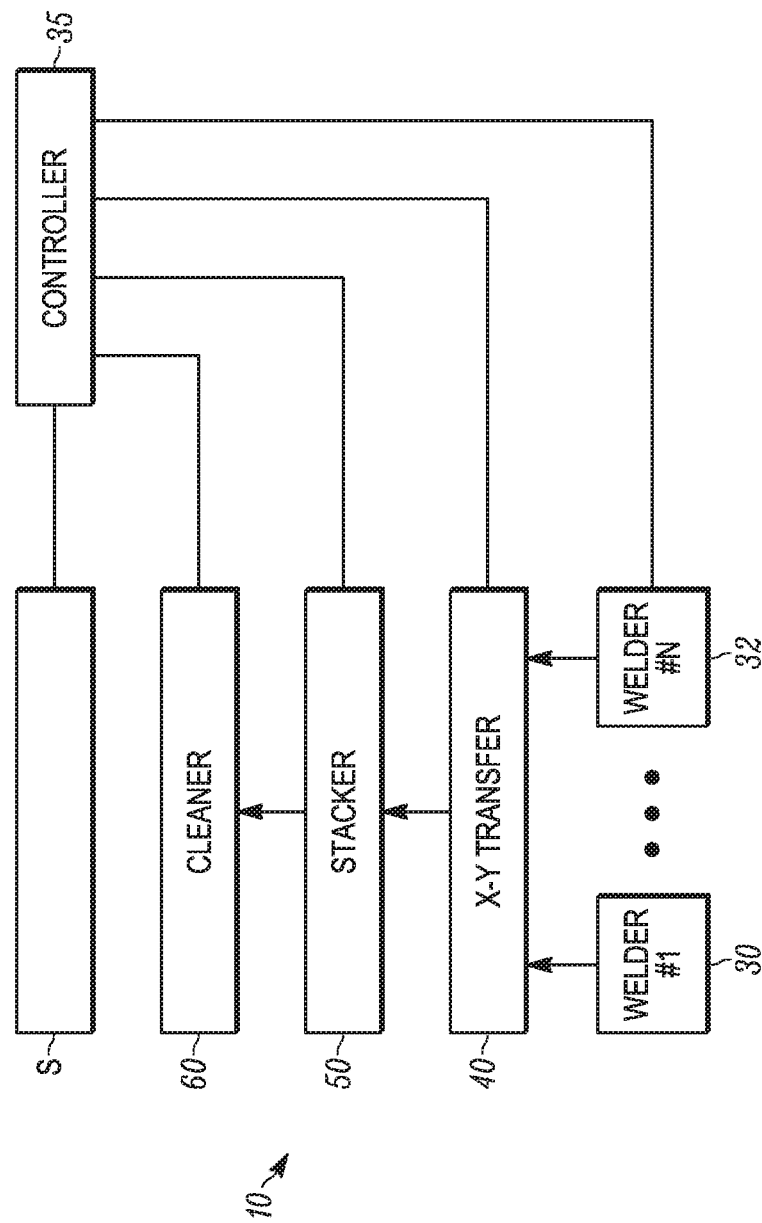
FIG. 1 is an overview schematic block diagram of a window frame or sash processing system.
Figure 3:
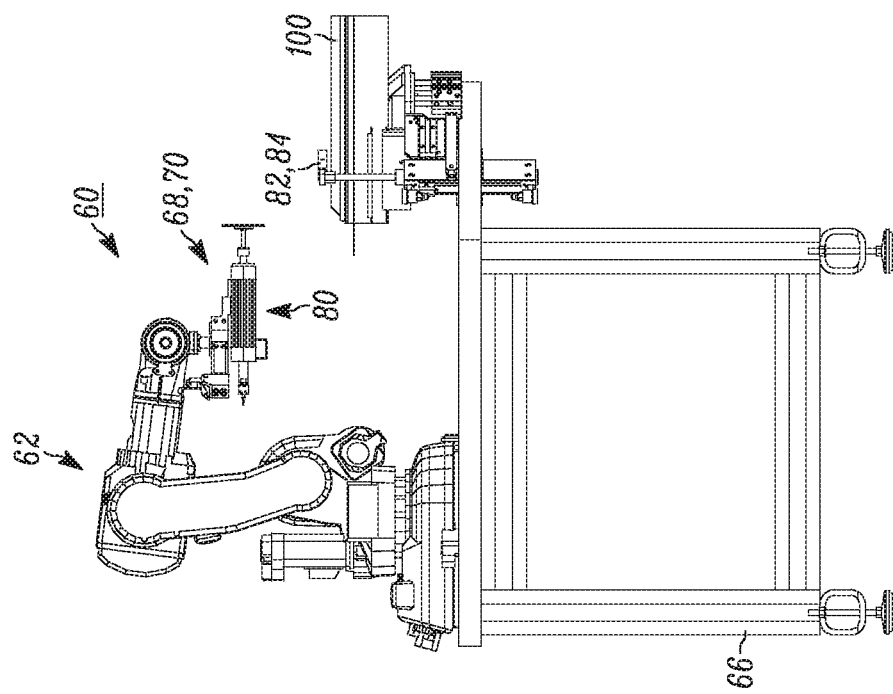
FIG. 3 is a first side elevation view of the cleaning station of FIG. 2.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements throughout unless otherwise noted. The present disclosure relates to a window cleaning system and method, and more particularly, a window cleaning system and method having flexible tool utilization and product recognition for cleaning or finishing window frames and/or sashes.

FIG. 1 schematically depicts a window processing system 10 for fabricating window frames or sashes (hereinafter frame members 100) and includes multiple welding stations 30, 32. In one embodiment, one or more of the welding stations is a sash welding station and one or more additional stations are frame welding stations. Customary usage in the window fabrication business refers to a frame as a stationary part of the window and a sash as the moveable part of the window which moved to open the window.

Typically, each of the welding stations has multiple welding heads that are independently actuated to move into position relative the different parts of a widow frame. In the disclosed embodiment, each welding station can have multiple frames or sashes stacked on top of each other. The welding stations and other stations, such as a cleaning station 60 are controlled by a controller or controllers 35.

An X-Y transfer table 40 supports welded frames delivered by a weld station exit conveyor and includes a mechanism for moving welded frames to a multi-tiered buffer or stacker 50. The buffer accepts frames from the X-Y table and stores the frames in different stacker layers to await cleaning. In one embodiment, belts automatically move the frame into a cleaner at a cleaning station 60. In an alternate embodiment, the welded frame is moved by hand from a welding machine and placed into a cleaning station.

Cleaning Station 60

Views of a cleaning station 60 constructed in accordance with one example embodiment of the present disclosure are illustrated in FIGS. 2-8. The cleaning station 60 comprises an articulating arm 62, one or more frame securing assemblies 64, a support stand 66, and tool support fixturing assembly 68. The tool support fixturing assembly 68 includes a tool support arrangement 70 for holding a plurality of cleaning tools 80 that are independently enabled and actuated by the controller 35 to translate and rotate into a position relative to selected portions of a window frame member 100. The controller 35 co-ordinates the operation of the welding heads at the weld stations, the conveyor that ejects welded frames 100 from the welding stations, and movement of the components to the x-y table through the stacker 50 to the cleaning station 60.

Figure 10:
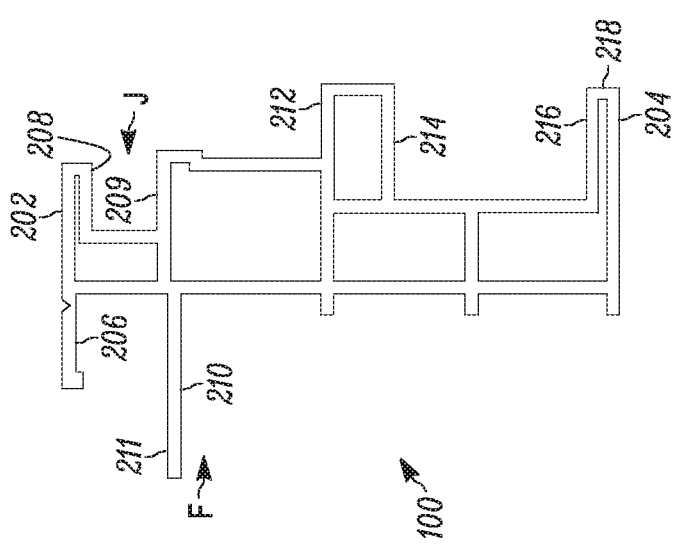
FIG. 10 is a section view illustrating a frame profile signature.
Figure 14:
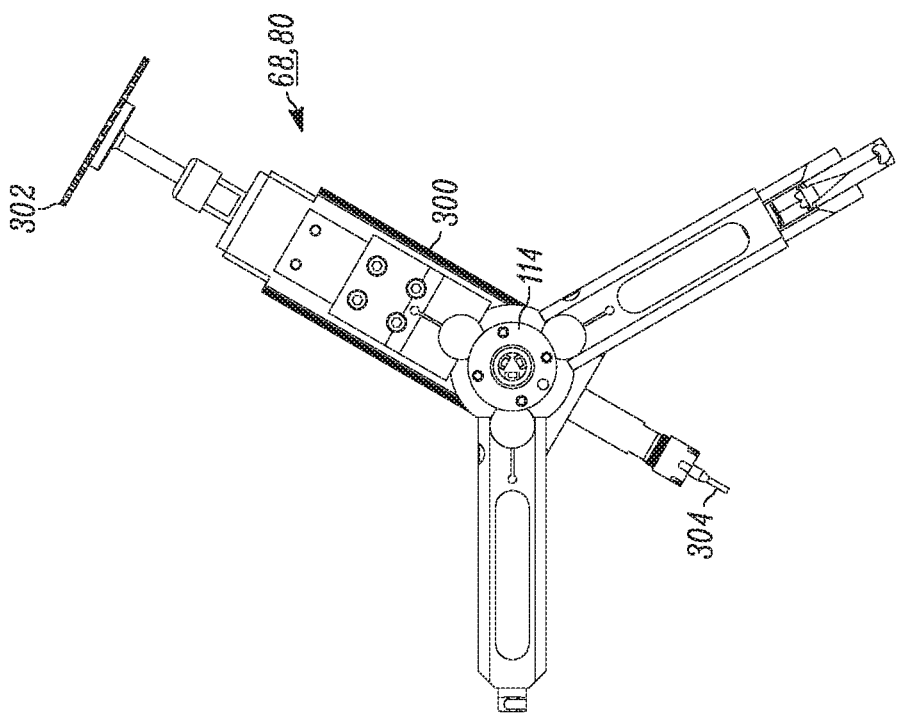
FIGS. 14-18 are various views of FIG. 12.
Figure 12:
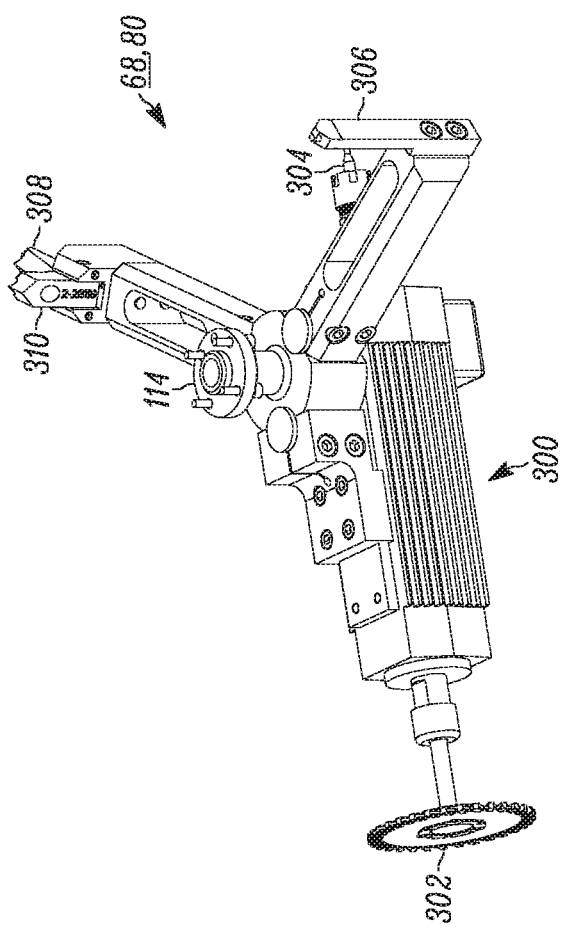
FIG. 12 is a perspective view of a tool support fixture assembly constructed in accordance with one example embodiment of the present disclosure, the tool support fixture assembly holding a number of different tools.
Figure 13:
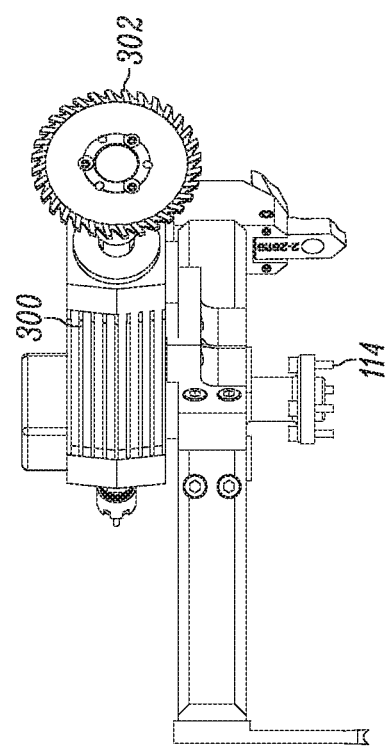
FIG. 13 is a side elevation view of FIG. 12.
Figure 16:
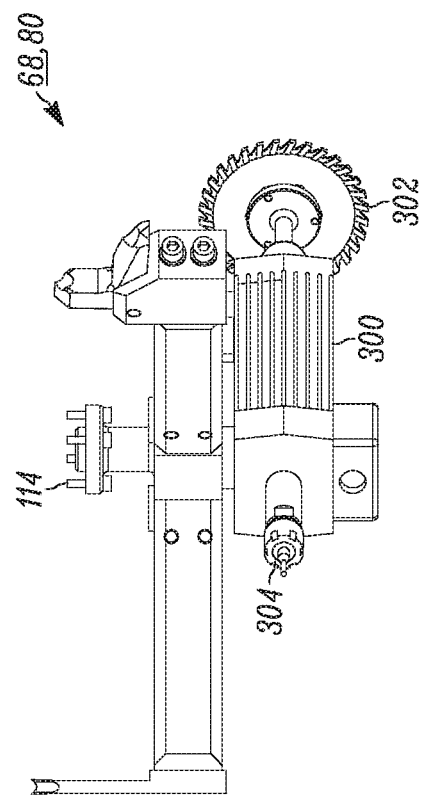
Figure 15:
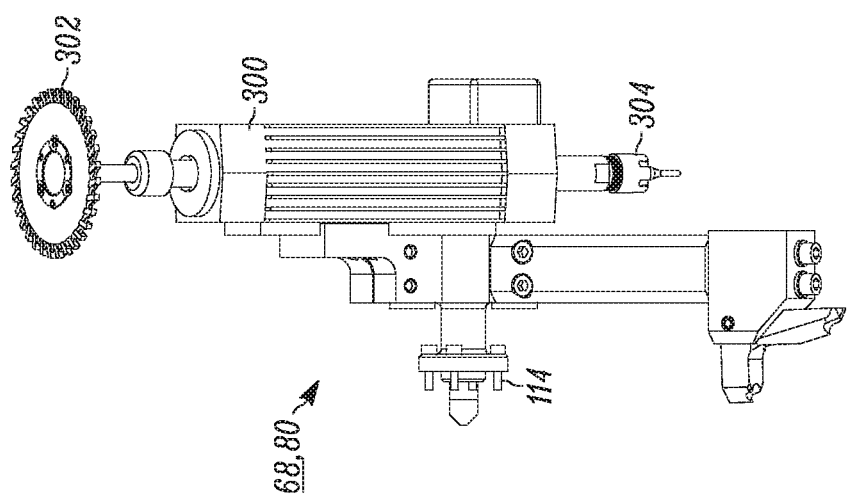
Figure 18:
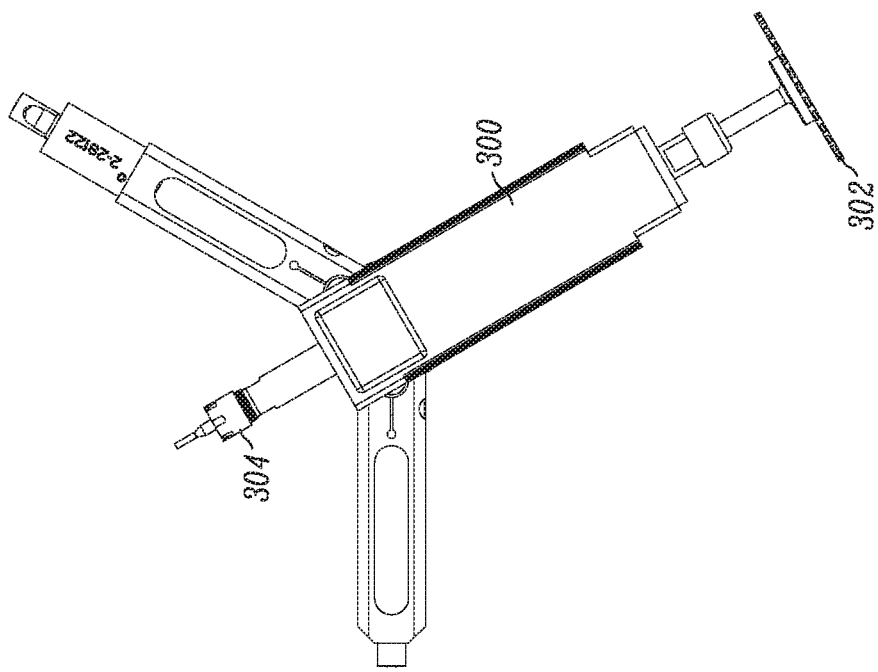

In the exemplary embodiment, a profile of a welded frame or sash 100 placed at the cleaning station is monitored by a sensor S. In one exemplary embodiment, the sensor S is a visual sensor that includes a laser, which scans along a line of the frame 100 profile (see FIG. 10) or a camera based sensor S that images an entire region of the frame. Other alternate embodiments utilize tactile or touch sensors S for determining a frame profile. In the exemplary embodiment the sensors S is a visual sensor that monitors a profile of the frame or sash 100. The profiling of the frame member 100 by the sensors in one example embodiment occurs when the frame member 100 is supported in a frame securing assembly 64.

Figure 2:
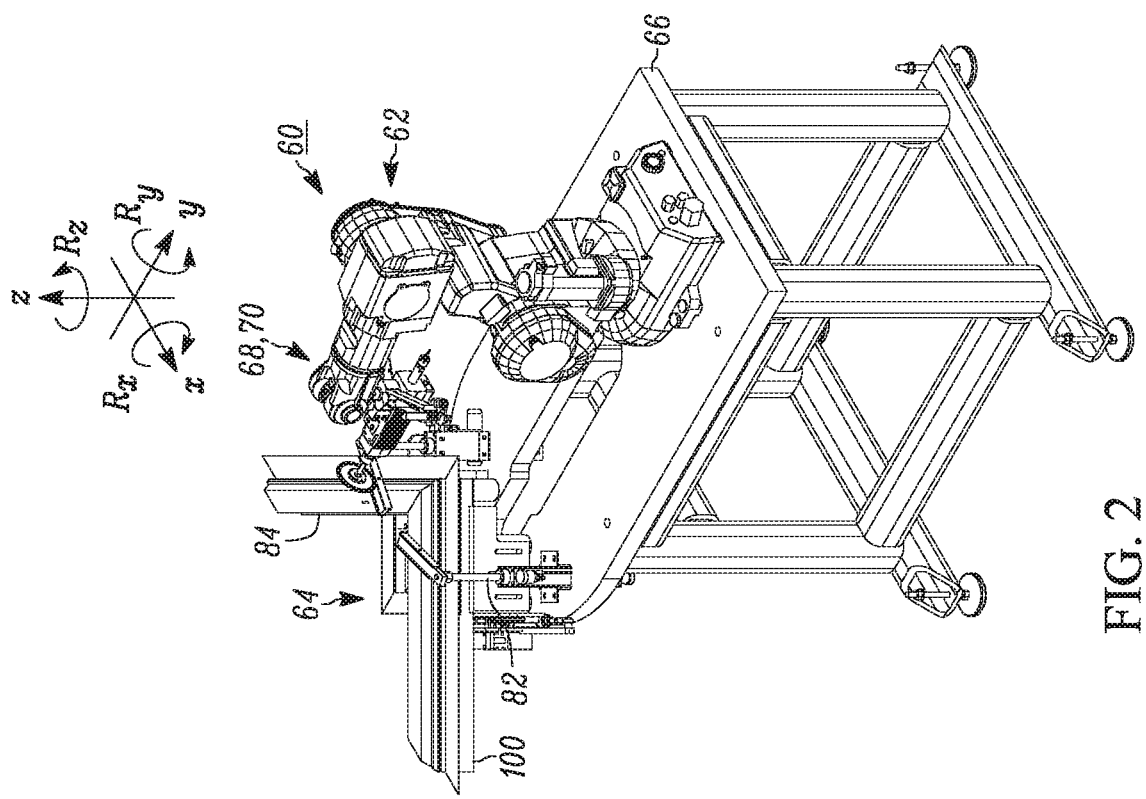
FIG. 2 is a perspective view of a cleaning station in accordance with one example embodiment of the present disclosure.
Figure 5:
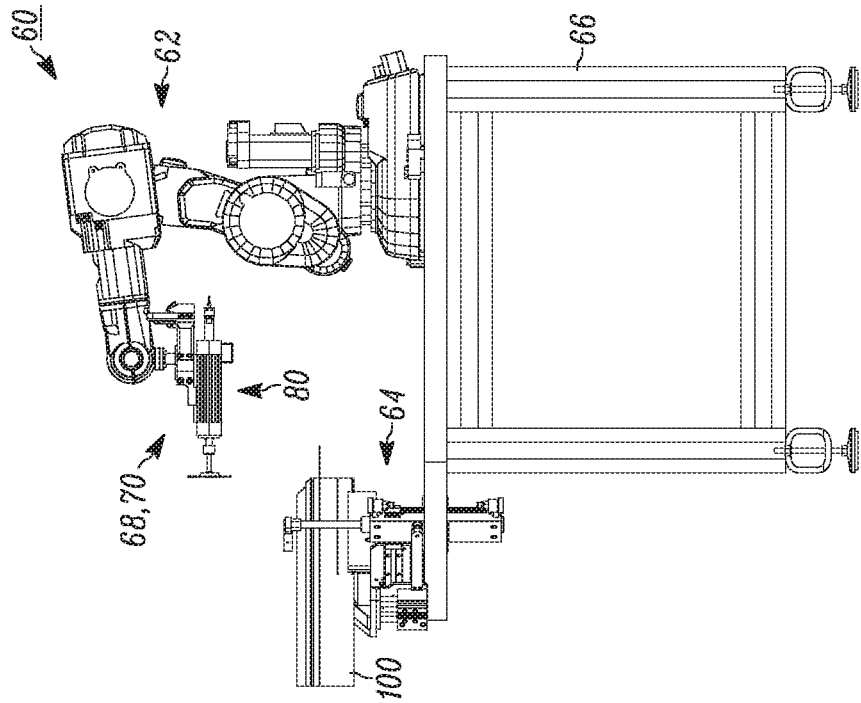
FIG. 5 is a second side elevation view of the cleaning station of FIG. 2.
Figure 4:
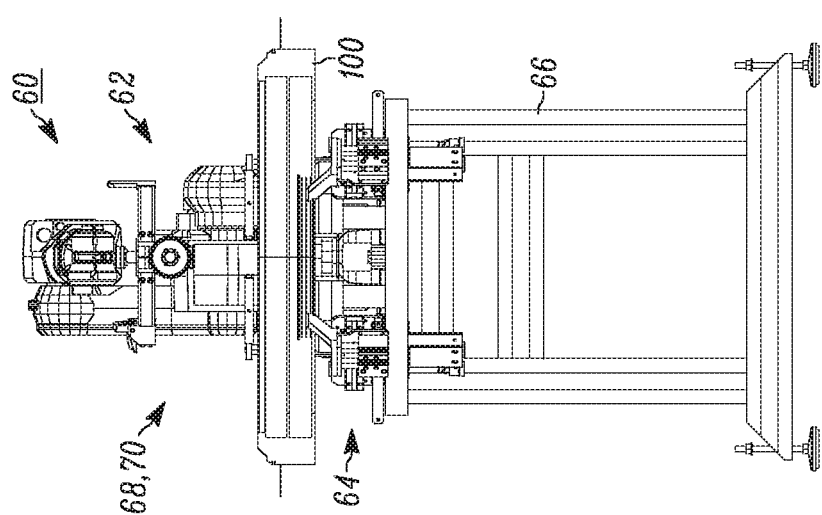
FIG. 4 is a front elevation view of the cleaning station of FIG. 2.
Figure 7:
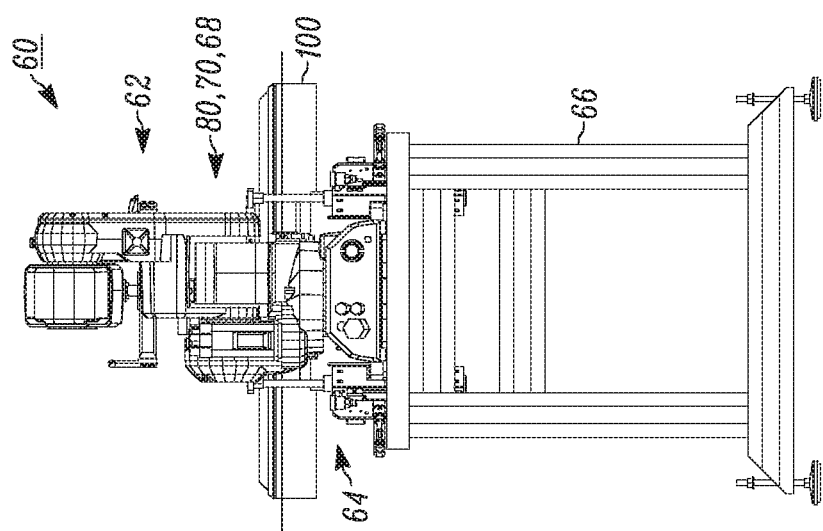
FIG. 7 is a rear elevation view of the cleaning station of FIG. 2.
Figure 6:
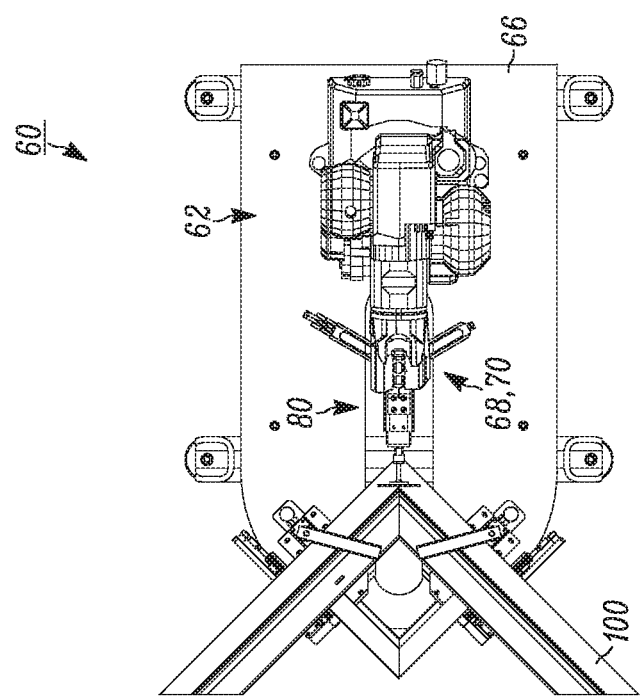
FIG. 6 is a top plan view of the cleaning station of FIG. 2.
Figure 35:
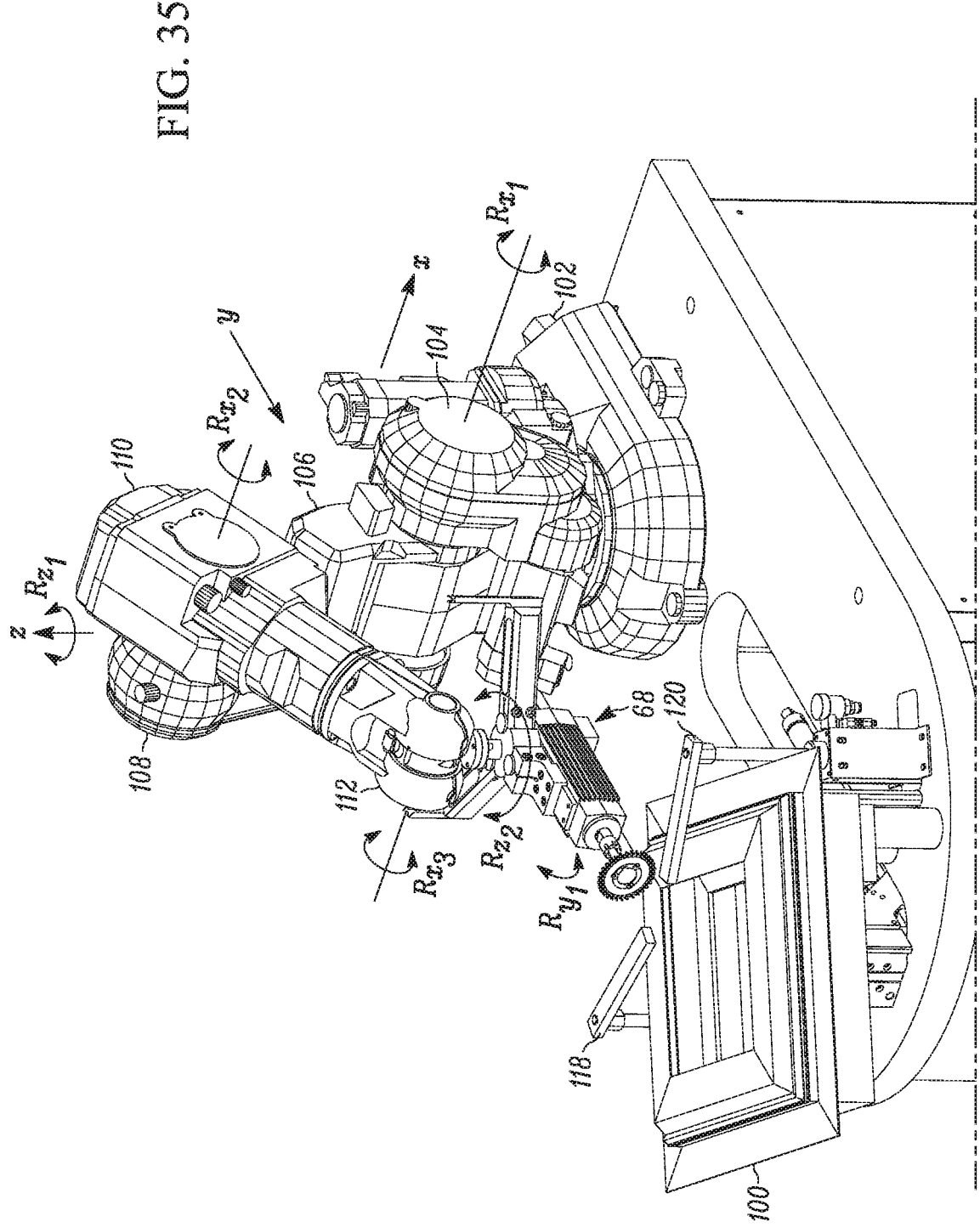
FIG. 35 is a cleaning station illustrating a first tool path for cleaning.

In the illustrated example embodiment, the articulating arm 62 is a six-axis articulating arm, that is, the arm is capable of translation in the X, Y, and Z axial directions as well rotation about each axis Rx, Ry, Rz, as illustrated by the coordinate system in multiple figures, including FIG. 2. The articulating arm 62 in more detail, as shown in FIG. 35 includes a base 102, first member 104, first arm 106, second member 108, second arm 110, and third member 112. The base 102 rotates about the Z axis, the first member 104, first arm 106, second member 108, second arm 110, third member 112, and tool support fixture assembly 68, as illustrated by $Rz_1$. The first member 104 rotates about the X axis, the first arm 106, second member 108, second arm 110, third member 112, and tool support fixture assembly 68, as illustrated by $Rx_1$. The second member 108 rotates about the X axis, the second arm 110, third member 112, and tool support fixture assembly 68, as illustrated by $Rx_2$. The third member 112 rotates about the X axis, the tool support fixture assembly 68, as illustrated by $Rx_3$. Secured to the third member is a coupling 114 that is mechanically attached to the tool support fixture assembly 68. The arm 62 rotates about the Z axis the coupling 114 and tool support fixture assembly 68, as illustrated by $Rz_2$. Each of the plurality of tools 80 can be oriented to rotate about the Y axis when operating as illustrated by $Ry_1$. In one example embodiment, the articulating arm is a six-axis arm manufactured by ABB of Zurich, Switzerland sold under part number ABB-IRB140, the datasheet being incorporated herein by reference.

Referring again to FIGS. 2-8, the cleaning station 60 includes a number of clamps and corresponding pins for fixing a frame 100 in place on the support stand 66. For example, the frame securing assembly 64 has fixed clamps or fencing 82 and 84 that contact an outer surface of the frame 100 in a region of one corner of a frame or sash. Further details of the fixed clamps 82 and 84 and their operation is found in U.S. Pat. Nos. 8,250,023 and 7,921,064, which are assigned to the assignee of the present disclosure and both patents are incorporated herein by reference in their entireties.

Figure 24:
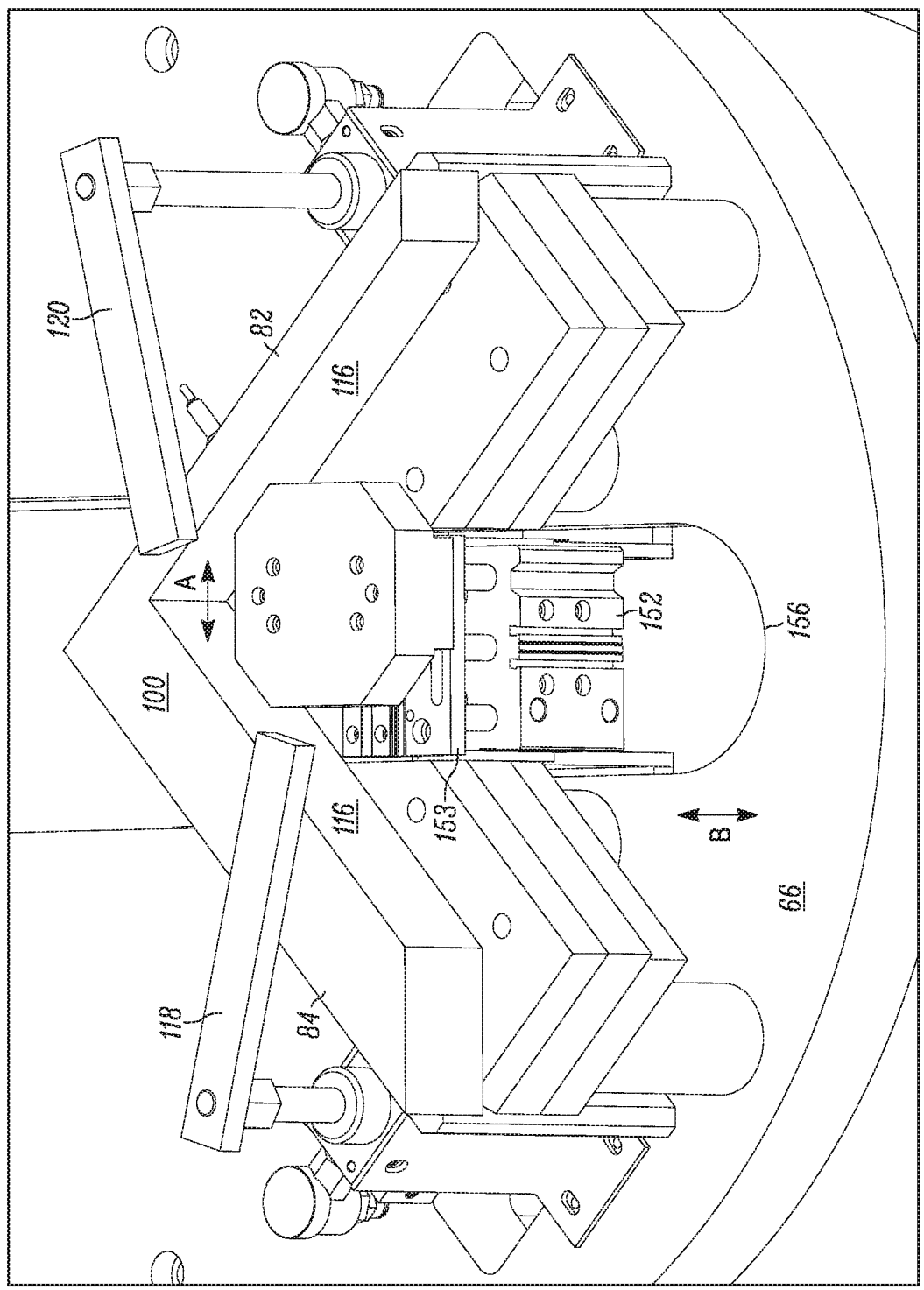
FIGS. 24 and 25 are perspective views of a frame member alignment assembly constructed in accordance with one example embodiment of the present disclosure.
Figure 25:
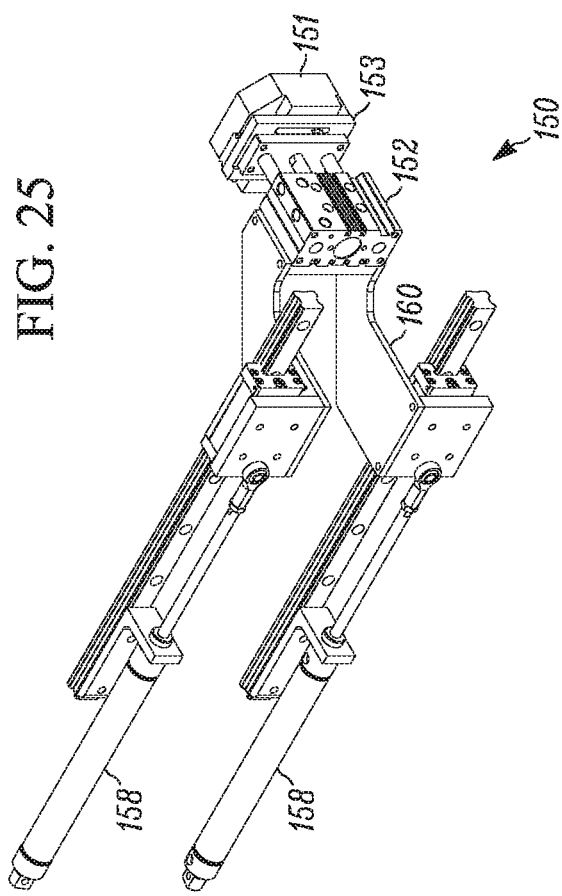
Figure 28:
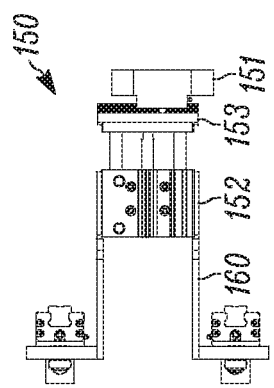
FIGS. 26-28 are various views of FIG. 25.
Figure 26:
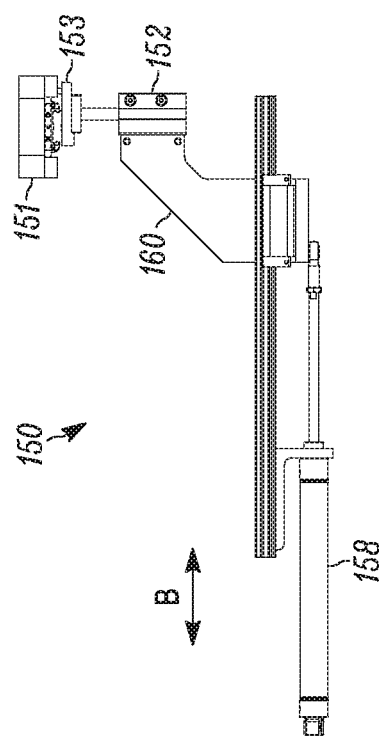
Figure 27:
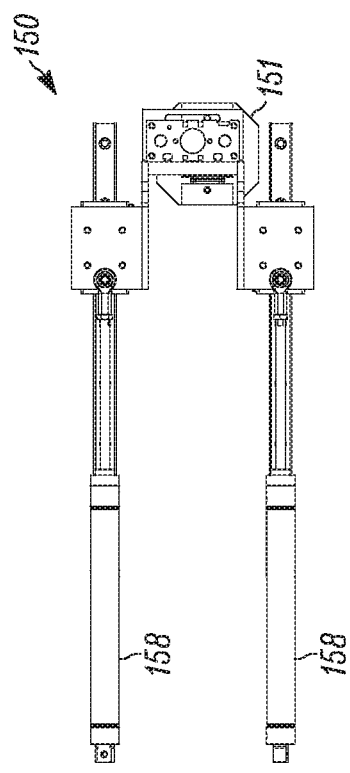

A frame member alignment assembly 150 is illustrated in FIGS. 24-28 and used to hold and align the frame member 100 against fencing clamps 82 and 84. The frame member alignment assembly 150, includes a guide member 151 made in one example embodiment from steel and rides freely on a slotted track 153, as illustrated in FIG. 24. This free movement (indicated by arrows A in FIG. 24) advantageously allows the guide member 151 to compensate and contact different sized inner sides 116 of the frame member 100 until the frame member contacts fencing 82, 84, as illustrated in FIG. 24. Once the guide member 151 pushes the frame member 100 into contact with the fencing, clamps 118 and 120 are actuated into contact with the frame member to hold it into position while the cleaning station performs one or more tooling operations on the frame.

The frame member alignment assembly 150 further includes the guide member 151, and slotted track 153 that are coupled to a vertical cylinder 152 that raises and lowers the guide member into contact position once the frame member is manually or automatically positioned/removed within the cleaning station 60. The vertical cylinder 152 is advanced vertically from a slotted opening 156 in the stand 66. A pair of cylinders 158 are coupled to a weldment 160 actuate the guide member 151 toward and away from the frame member 100 within the slot 156 as indicated by arrows B. The cylinders 158 and vertical cylinder 152 are in communication with controller 35 and sensor S, and accordingly programmed to engage the frame member based on the frame 100 profile.

Figure 11:
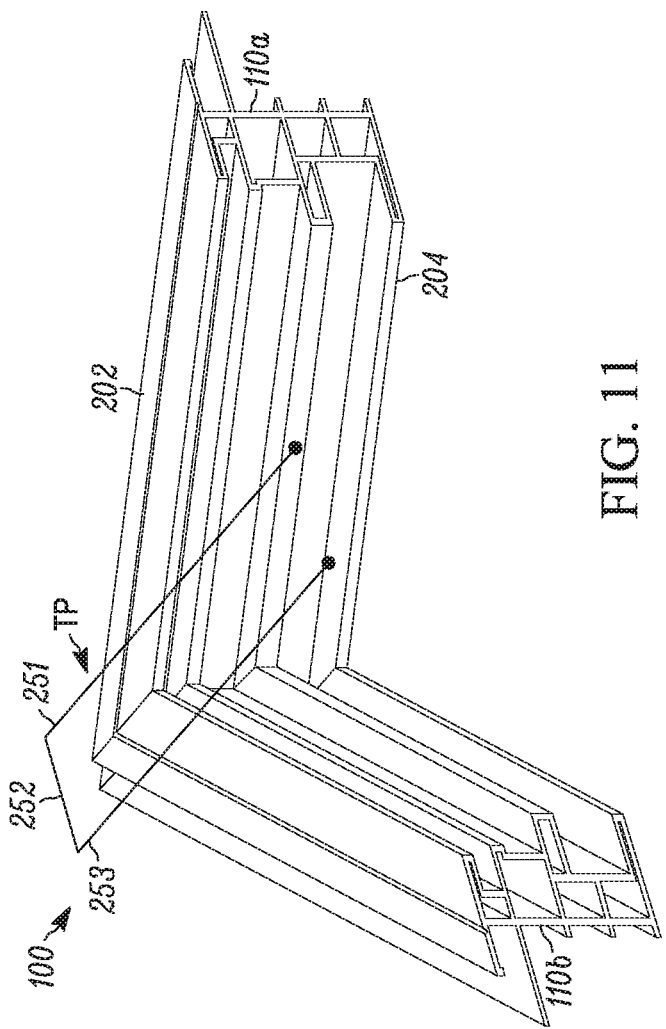
FIG. 11 is a perspective view of two assembled frame or sash members connected at a corner by welding.

The frame member 100 has top and bottom surfaces 202, 204, respectively (FIGS. 10 and 11) that are oriented within the frame securing assembly 64 in a generally horizontal plane with respect to a shop floor. In the example embodiment illustrated in FIGS. 2-8, the cleaning tools 80 of the cleaning station 60 operate on one corner of a frame member 100 at a time. However, illustrated in the example embodiment of FIG. 34, the single cleaning station 60 can clean plurality of frame members 100 each at respective stations, namely A, B, C, and D, each station having a frame securing assembly 64. The articulating arm 62 rotates between the different stations A, B, C, and D, performing tooling operations on each independently of the other stations and frames 100. It should be appreciated that while the articulating arms and plurality of tooling operations are being performed at any given station, frame members 100 at the remaining stations could be manually or automatically removed, replaced, or rotated with new frame members, allowing constant operation of the tooling 80 without interruption.

Figure 34:
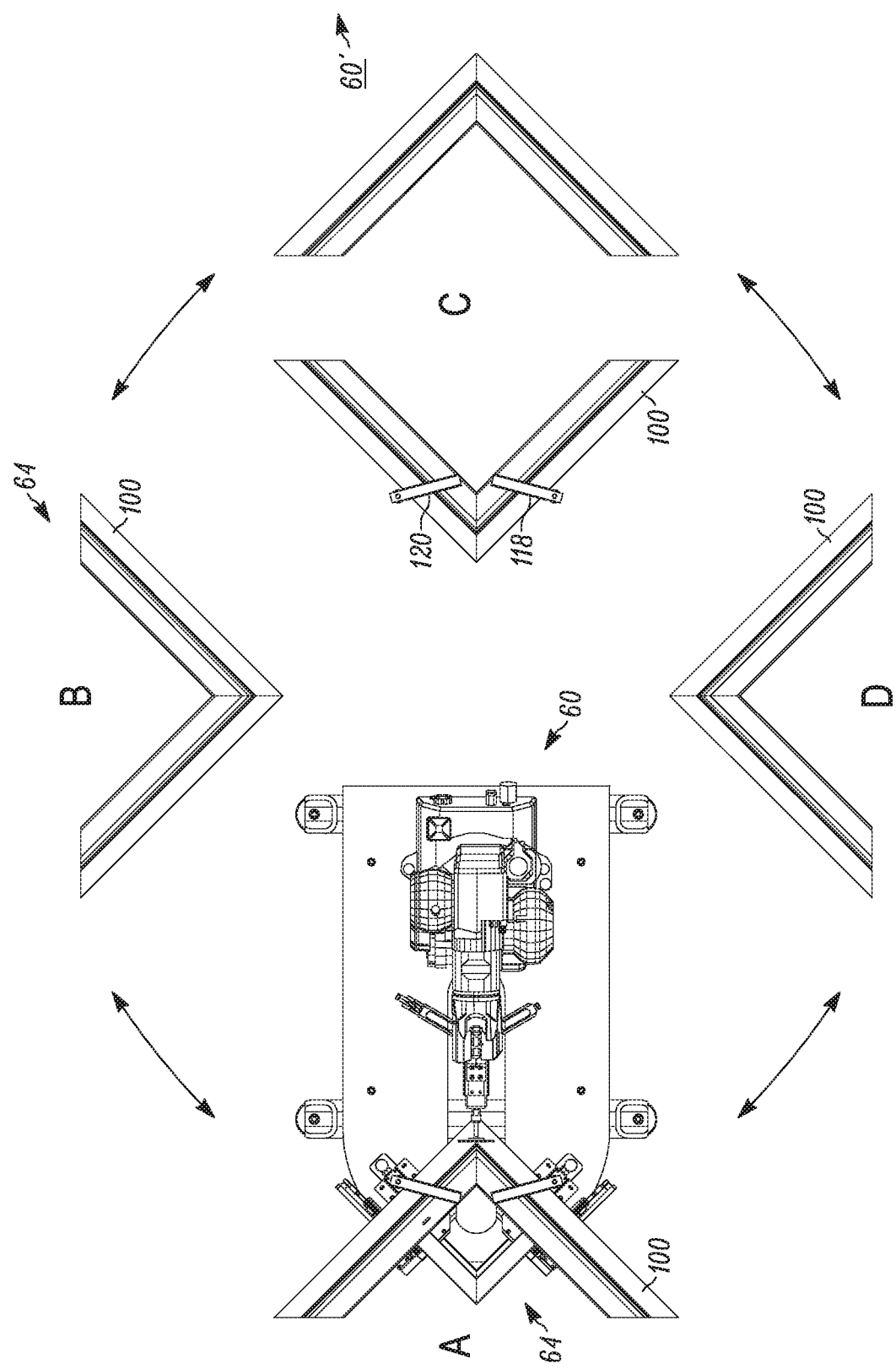
FIG. 34 is a cleaning station operating on one of four frame fixturing stations in accordance with one example embodiment of the present disclosure.

It should further be appreciated that other cleaning stations, e.g. 60, similarly constructed could be operating on the remaining corners of a given frame member 100, for example at station C, as illustrated in FIG. 34. In another example embodiment, after a corner of the frame member 100 is cleaned the clamps 82, 84 and guide member 151 are released/retracted and the frame member is lifted by an operator or robot, which reorients the frame or sash for cleaning one of other three corners by the same cleaning station.

The tool support fixture assembly 68 and the plurality of tools 80 shown in the example embodiment of FIGS. 2-8 and 12-18 includes a motor 300 (either electric or air) having a rotating circular blade 302 at a first end and a router bit 304 at a second end. The motor 300 is operatively coupled to the controller 35. The tool support fixture 68 and plurality of tools 80 further includes a knife 306 and first and second shapers 308 and 310 transverse to each other, and in the illustrated example embodiment at approximately 90 degrees.

Figure 37:
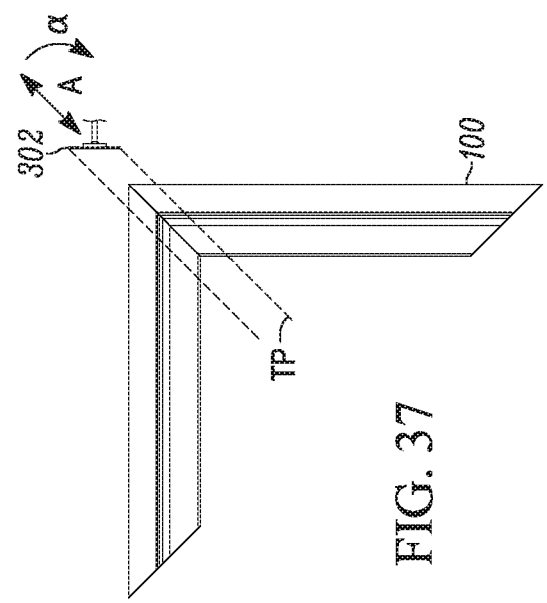
FIG. 37 is a magnified view of the cleaning station of FIG. 35 illustrating a second tool path in accordance with another example embodiment of the present disclosure.
Figure 36:
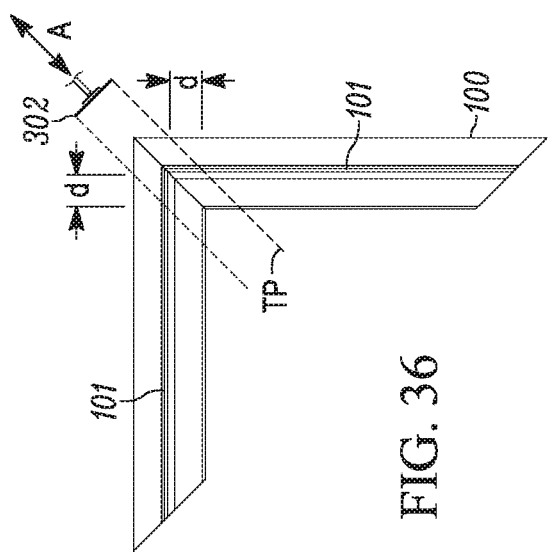
FIG. 36 is a magnified view of the portion of the cleaning station in FIG. 35.

As shown in FIGS. 35-37, the saw moves in and out to contact corner locations of the frame member 100 along an outer periphery creating a tool path (TP) illustrated in phantom. The frame member 100 often includes felt or plastic protrusions 101 in which it is desirable that cutting or removal is minimized, while the removal of the bead and/or flattening of the frame surface is maximized. If the tool path crosses the felt or protrusions 101, portions could be undesireably removed, as illustrated as dimension "d" in FIG. 36.

Figure 9A:
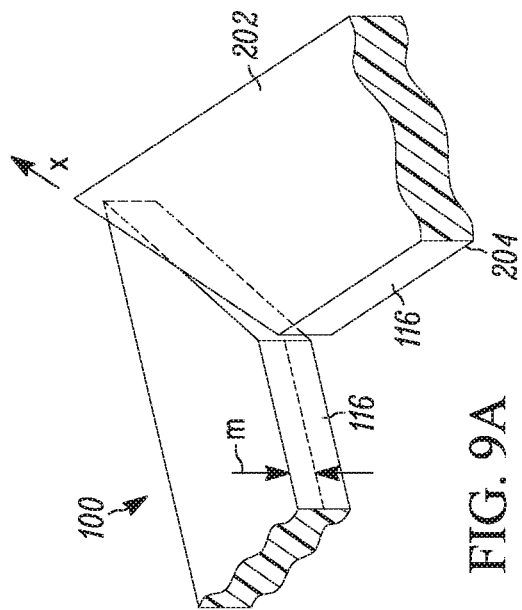
FIG. 9A is a section of a frame member where abutting sections are misaligned during welding.
Figure 9B:
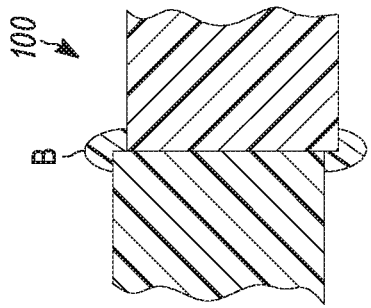
FIG. 9B is a sectional view of a frame member where abutting sections are misaligned and welded together by bead B.
Figure 9D:
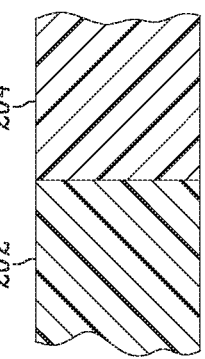
FIG. 9D is a sectional view of a frame member where the bead and corner edges have been cleaned to be parallel or planar on the top and bottom surfaces.
Figure 8:
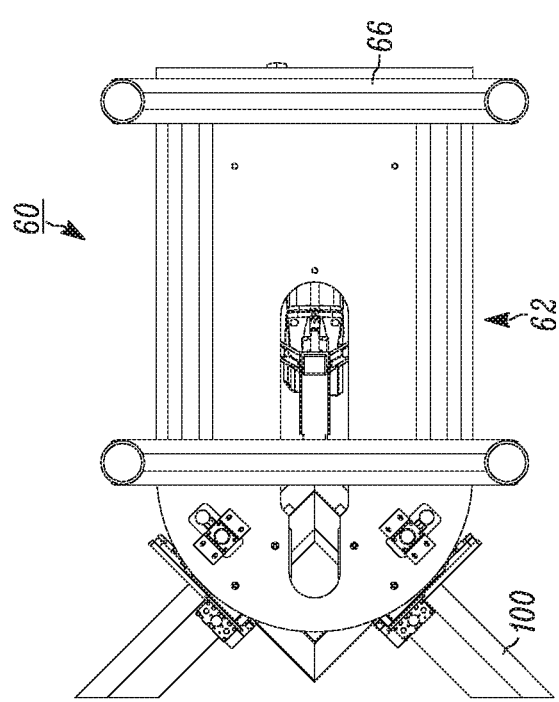
FIG. 8 is a bottom plan view of the cleaning station of FIG. 2.
Figure 9C:
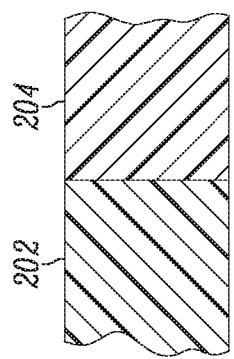
FIG. 9C is a sectional view of a frame member where a bead is formed at a corner of a frame member.

The articulating arm 62 in the present disclosure advantageously allows the saw blade 302 to be rotated at such an angle to minimize removal of the felt, protrusion, or desired material 101, as illustrated in FIG. 37. This is achieved by rotation of the articulating arm's Z axis rotation $Rz_2$ by the angle α as illustrated in FIG. 37 as it moves across the frame 100 along tool path TP indicated by arrows A. While performing this movement, the saw 302 contacts and abrades away a bead B of weld flash on the top and bottom surfaces 202 and 204, as illustrated in FIGS. 9B and 9C. The saw and/or router 302, 304 can also remove alignment imperfections shown in FIG. 9A, such that the top 202 and bottom 204 of the frame 100 is made parallel, flat, and/or planer surfaces, as illustrated in FIG. 9D. Such task could be equally performed by the shapers 308, 310, or knife 306, or any combination of the plurality of tools 80, each tool having a different work implement for abrading, cutting, scraping, scarfing, and the like, for the inside or outside of the frame to remove weld flash or uneven surfaces. In one exemplary embodiment, the entire cleaning process of multiple tool 80 operations for a frame 100 can be performed on the order of 20 to 40 seconds.

Figure 29:
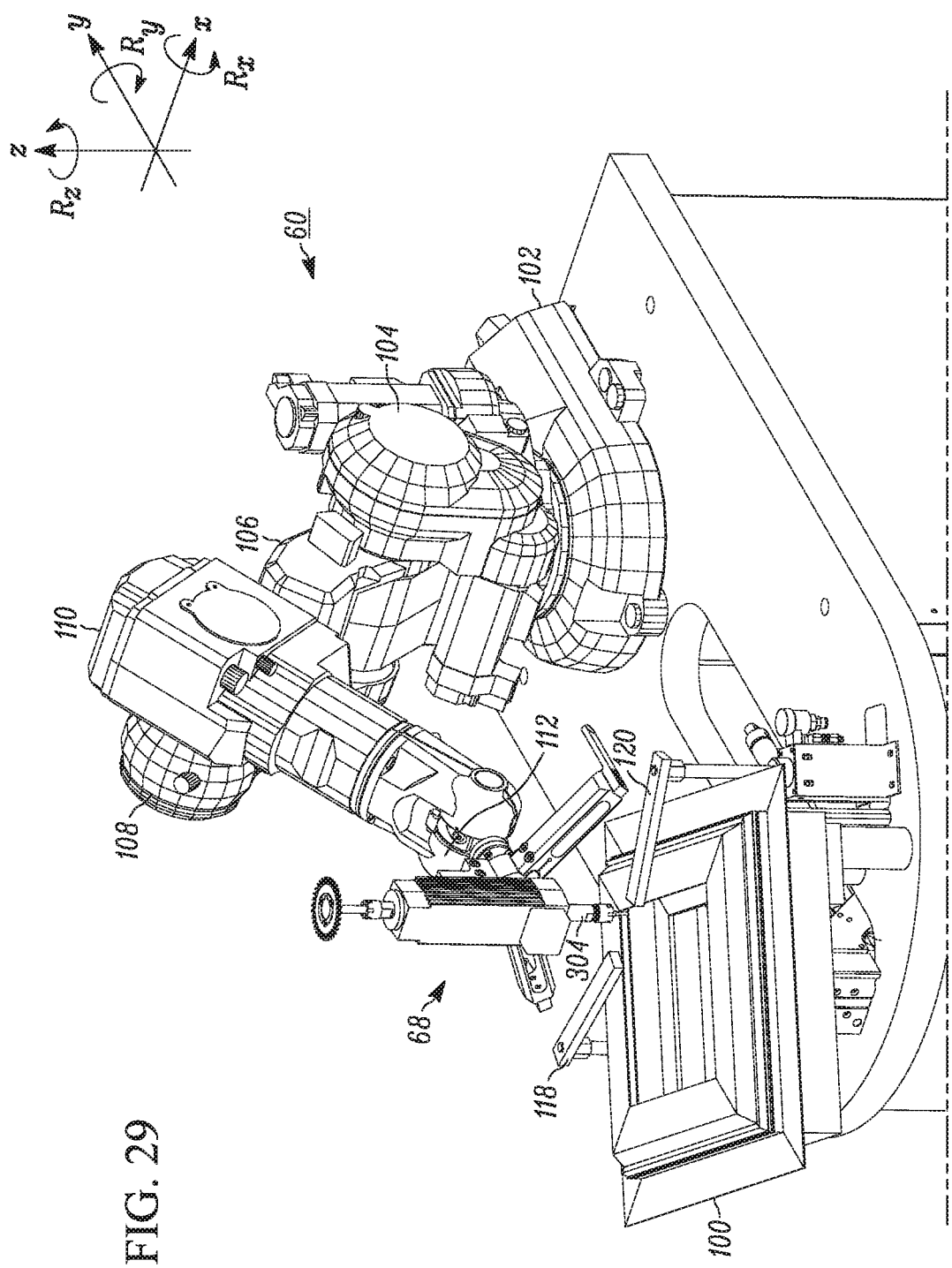
FIG. 29 is cleaning station using a first tool on a frame member in accordance with one example embodiment of the present disclosure.
Figure 30:
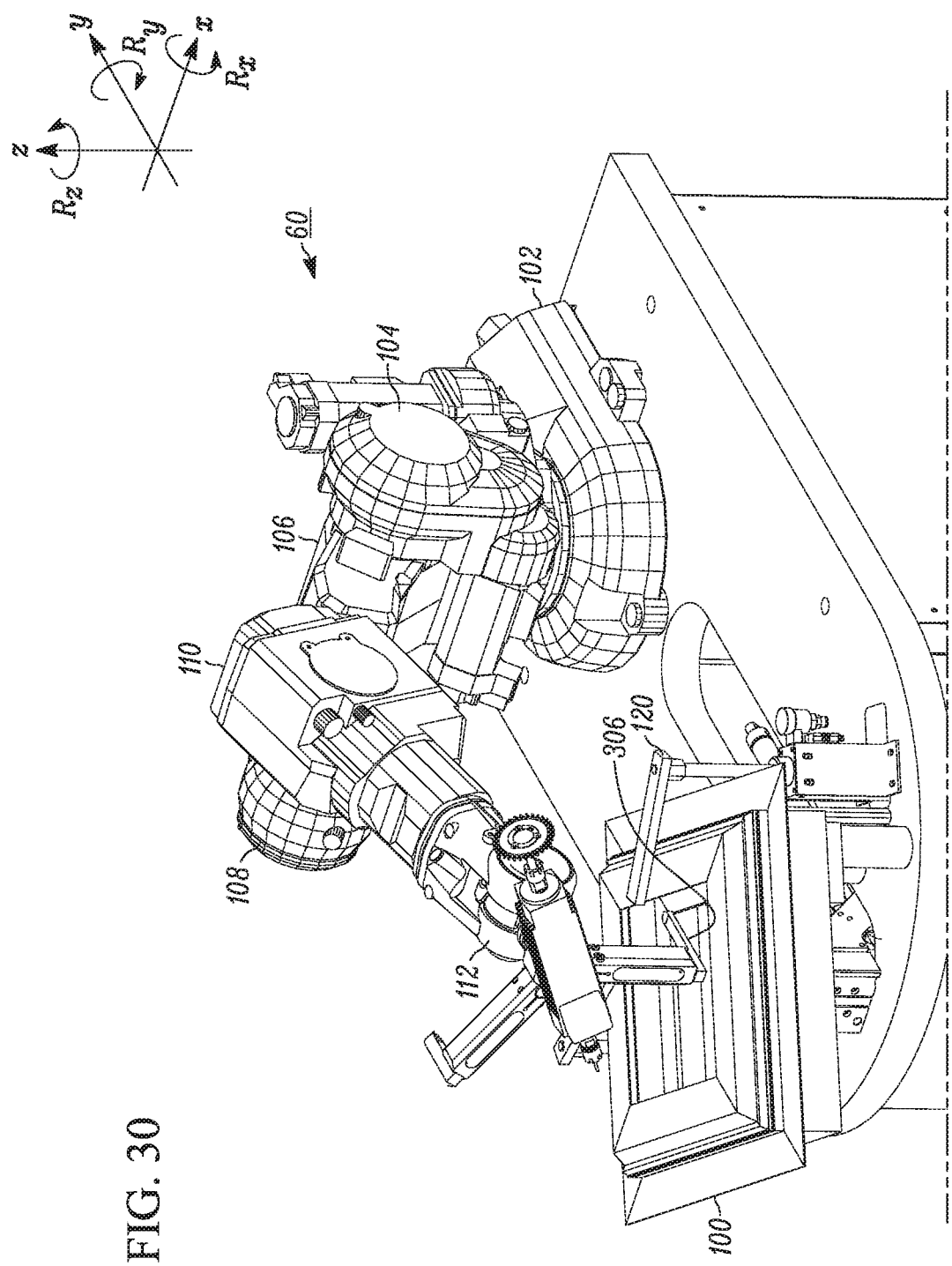
FIG. 30 is cleaning station using a second tool on a frame member in accordance with one example embodiment of the present disclosure.
Figure 31:
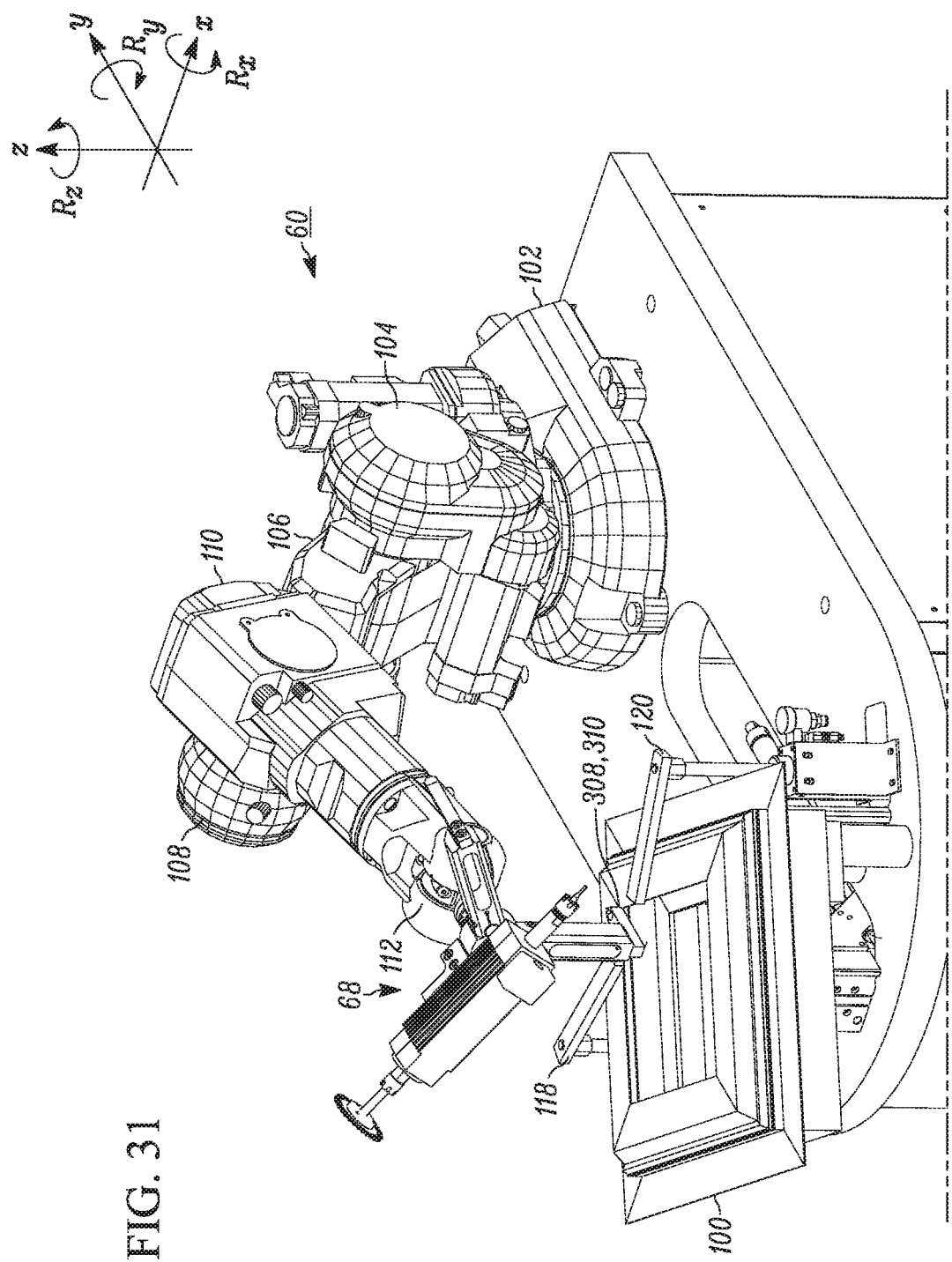
FIG. 31 is cleaning station using a third tool on a frame member in accordance with one example embodiment of the present disclosure.
Figure 32:
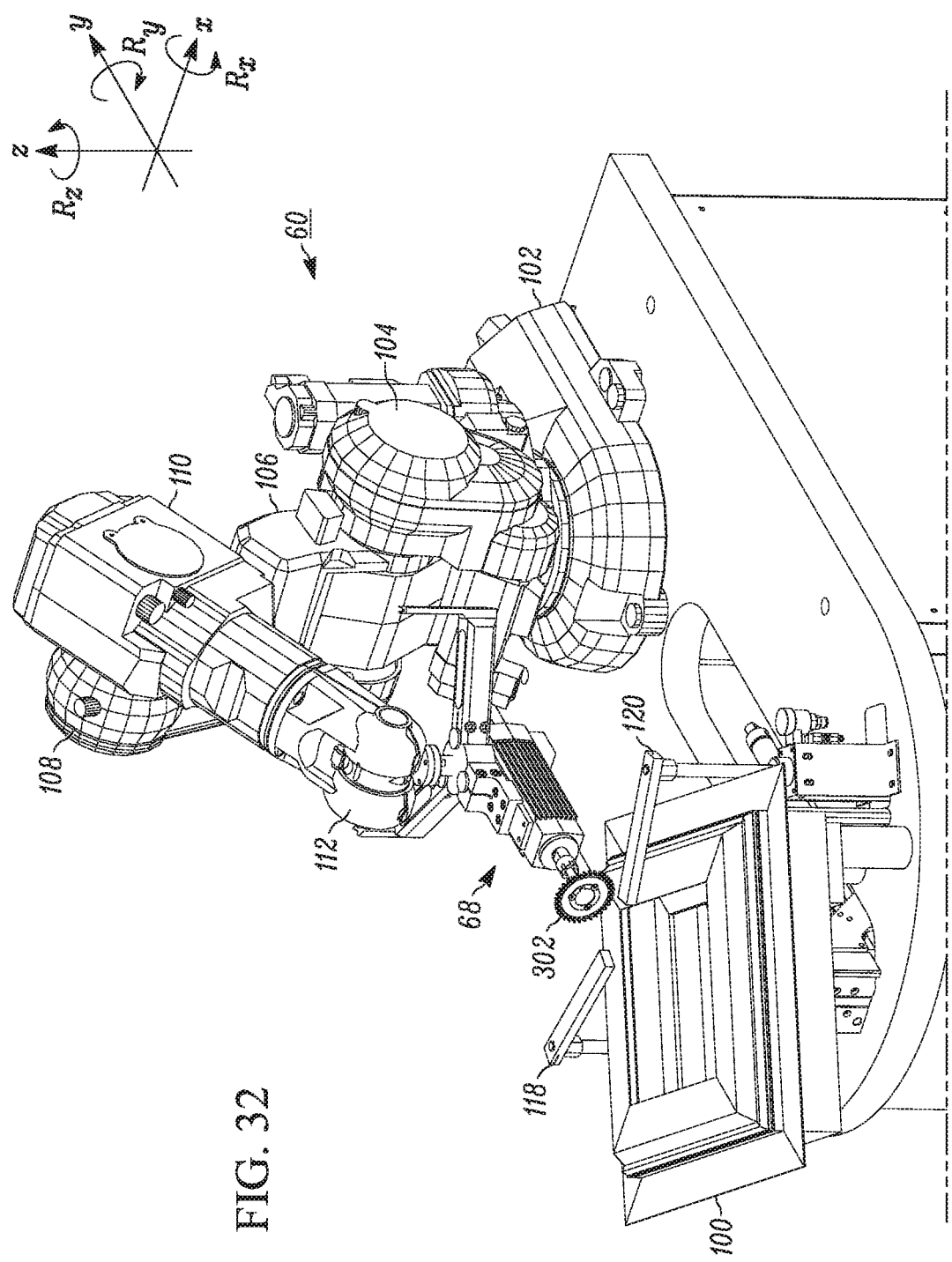
FIG. 32 is cleaning station using a fourth tool on a frame member in accordance with one example embodiment of the present disclosure.
Figure 33:
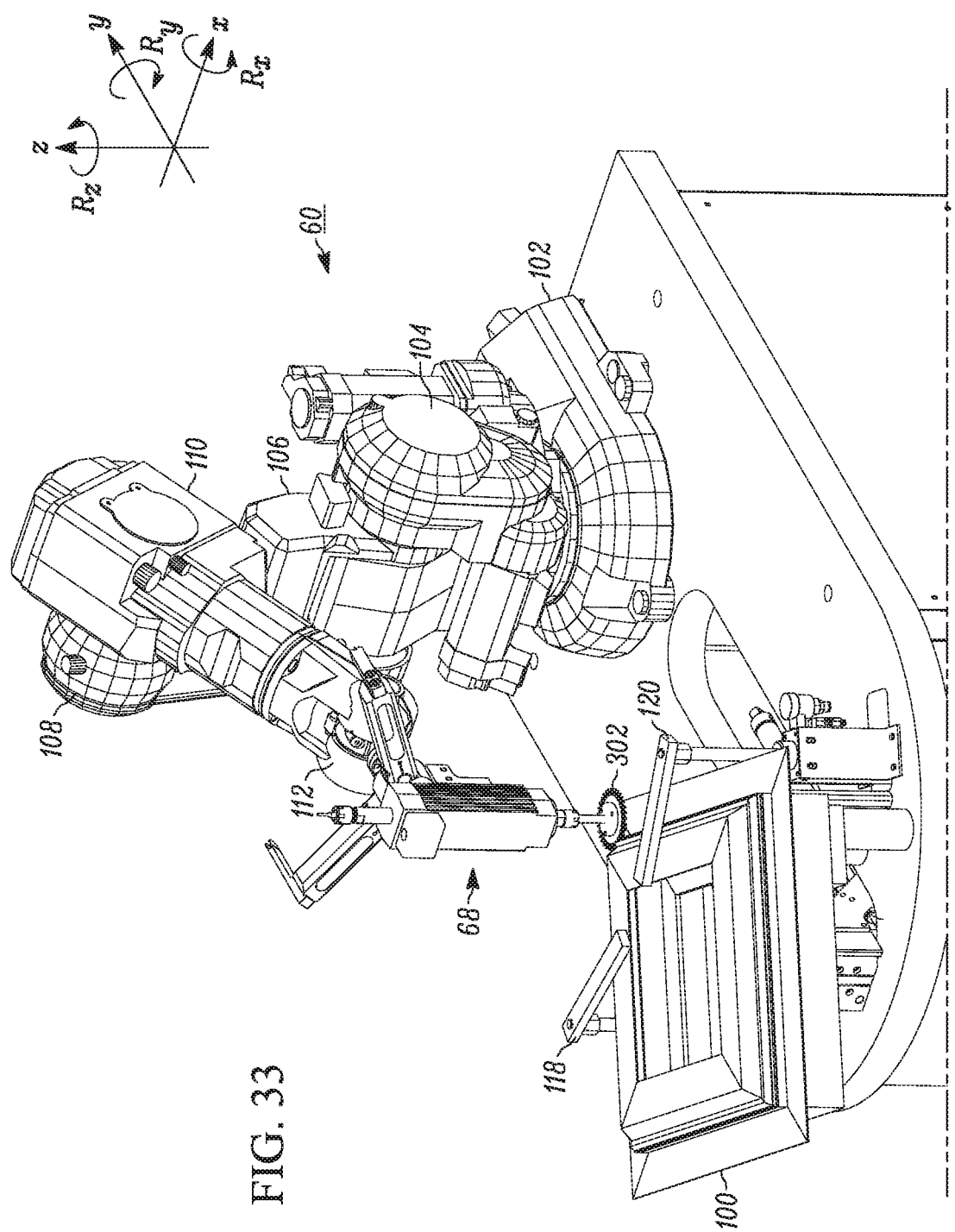
FIG. 33 is a cleaning station using the fourth cleaning tool on a frame member in a different orientation in accordance with one example embodiment of the present disclosure.

Illustrated in FIGS. 29-39 are various tools 80 being used by a cleaning station 60 on a frame member 100. FIG. 29 illustrates the use of a router 304, FIGS. 30, 38, and 39 illustrate the use of a knife 306, for cleaning the inside and under inside of a frame member 100. In particular, the arm 62 moves along the Y axis while rotating along the X axis to clean the under inside of the frame 100, as shown in the magnified view of FIG. 39. This controlled and flexible motion was not possible in prior window frame and sash cleaning stations. FIG. 31 illustrates the use of a shaper 308 or 310 on a corner of a frame member 100. FIGS. 32 and 33 illustrate the use of a saw 302 in both a substantially vertical orientation and horizontal orientation, cutting away weld flashing, leveling, or removing undesired portions of the frame geometry.

Figure 19:
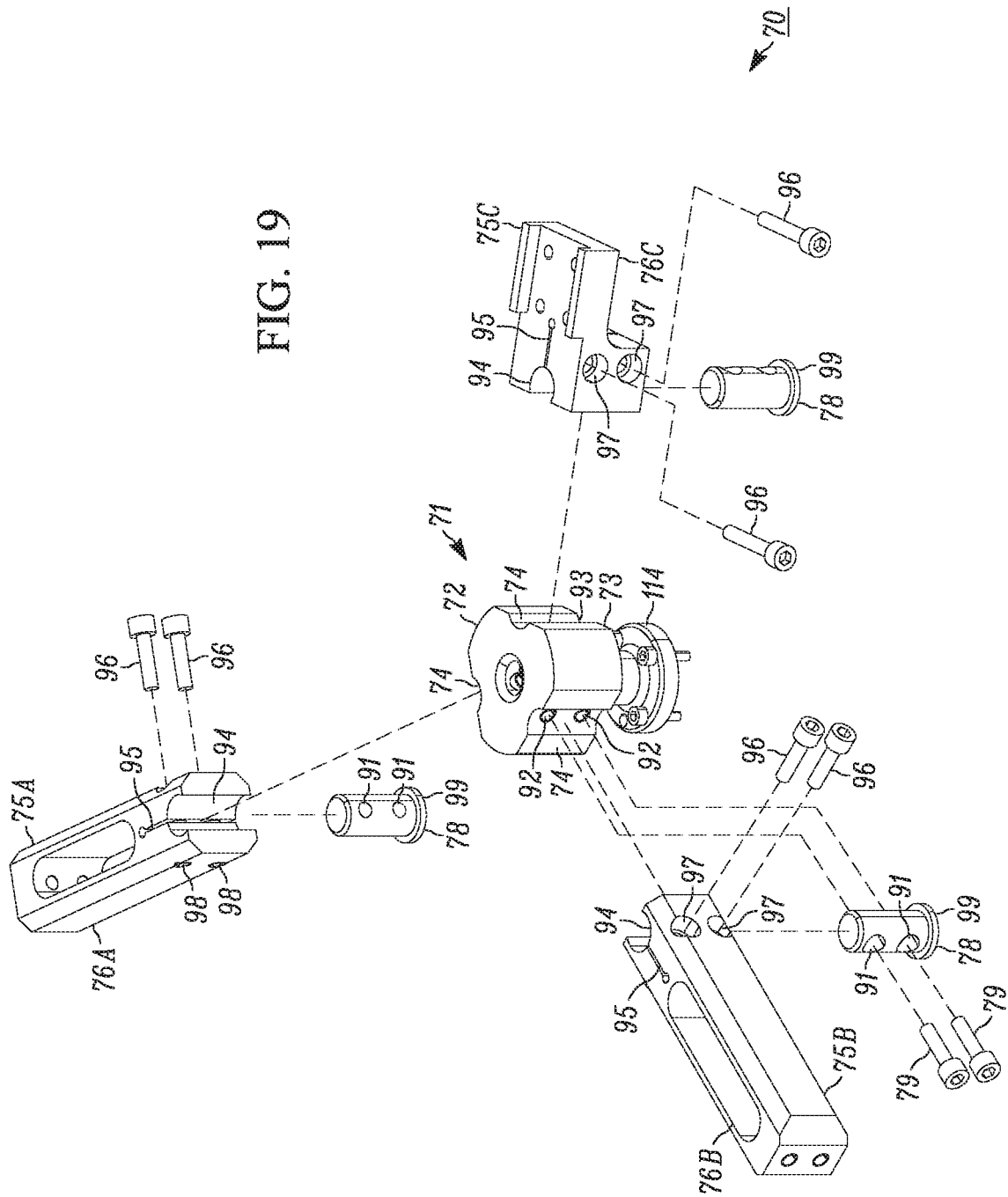
FIG. 19 is a tool fixture arrangement constructed in accordance with one example embodiment of the present disclosure.
Figure 21:
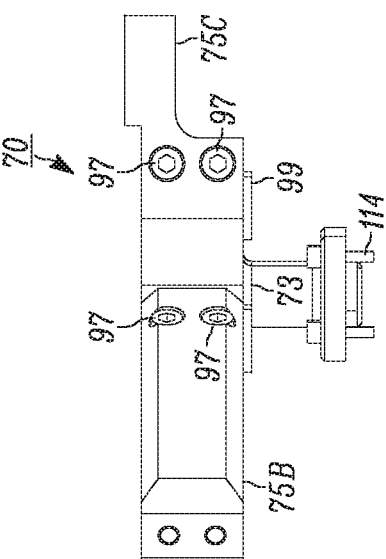
FIGS. 20-23 are various views of FIG. 19.
Figure 20:
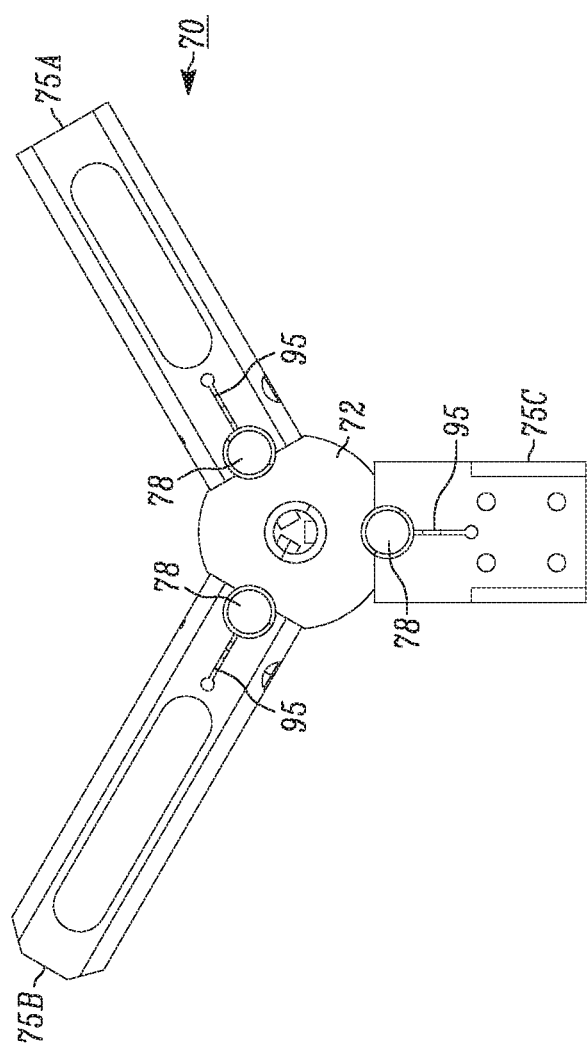
Figure 23:
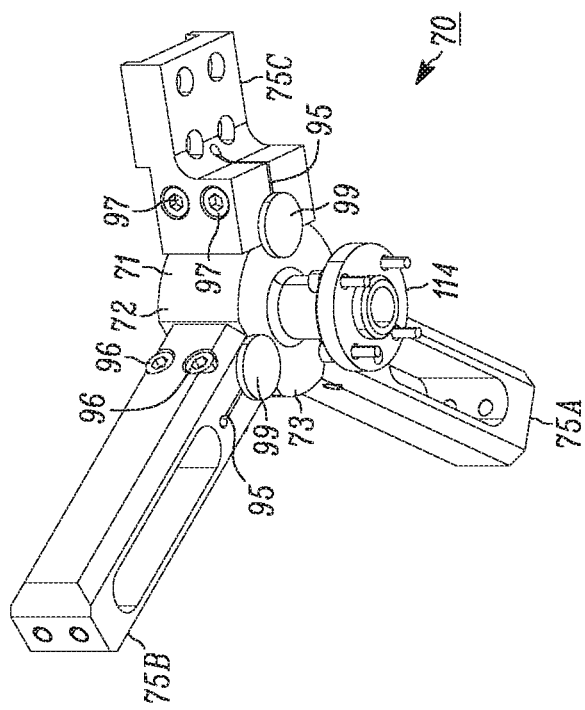
Figure 22:
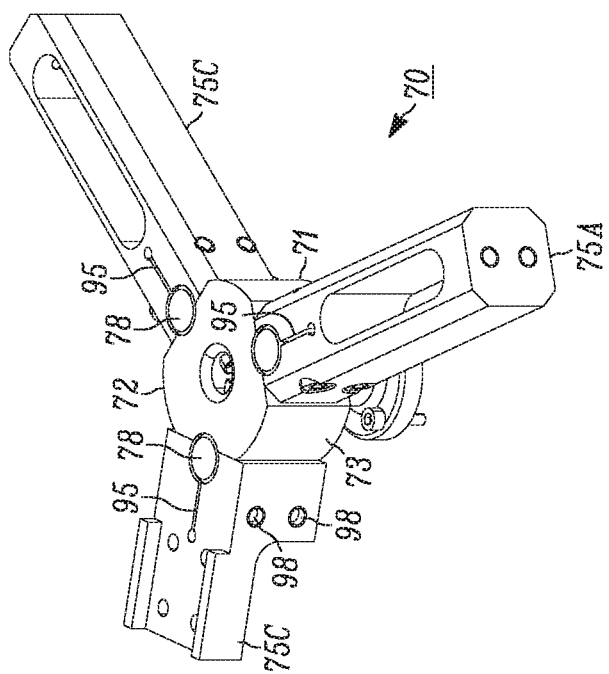

Referring now to FIGS. 19-23 is a tool fixture arrangement 70 constructed in accordance with one example embodiment of the present disclosure. FIG. 19 illustrates an exploded view of the arrangement 70. The arrangement 70 comprises a body 71 having top 72 and bottom 73 ends spaced by a plurality of faces 74. Extending from each face 74 is a leg 75 for supporting one or more of the plurality of tools 80. In the illustrated example embodiment, the body supports three different legs 75A, 75B, and 75C at a 60 degree spacing about the body. It should be appreciated by those skilled in the art that more or less legs 75 could be supported by the body 71 without departing from the spirit and scope of the present disclosure.

Secured to the bottom 73 of the body 71 is the coupling 114, which during operation is rotatably attached at the third member 112 of the articulating arm 62. Each leg 75 includes a support 76 that includes openings, slides, and/or tapped holes for supporting one or more of the plurality of tools 80 as would be appreciated by one of skill in the art. For example, the support 76C includes a L-shaped bracket for supporting a motor 300, support 76A is for attaching first and second shapers 308 and 310, and support 76B is constructed to hold knife 306. In the illustrated example embodiment, the tool support fixture assembly is constructed of tool steel.

Figure 17:
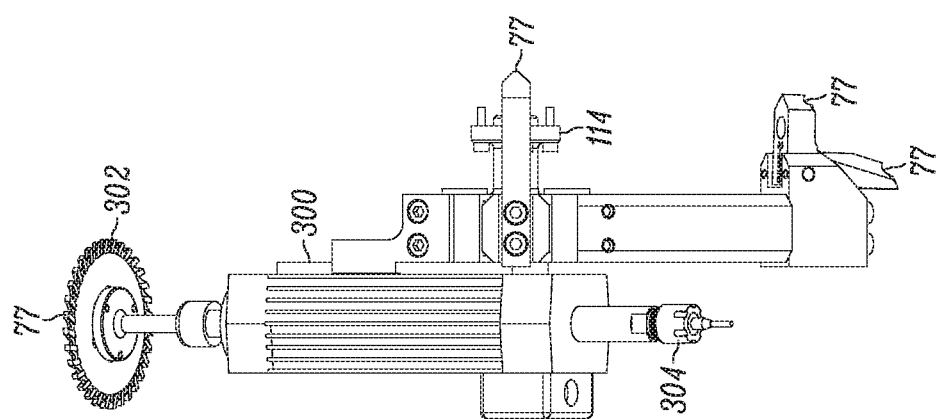

The tool fixture arrangement 70 is designed for quick changing of the support 76 and corresponding tool or tools 80 secured thereto. This would be advantageous for necessary changes corresponding to broken tools, dull tools, and product changes requiring a different tool not already on the cleaning station 60. The attachment of the legs 75 to the body 71 is such that a typical change of the removal of the leg and corresponding tool attached thereon can occur with a replacement of a different leg and tool within one minute or less by an experienced job setter. Moreover, the quick change design and construction of the tool fixture arrangement 70 holds a known tool positioning 77 (as illustrated in FIG. 17) within five thousands of one inch (0.005") in all three planes X, Y, and Z defined by the coordinate system in the illustrated drawings, known by the controller 35 for each tool in the plurality of tools 80.

The quick change design of the arrangement 70 includes a arcuate guide 78 for leading each of the legs 75 onto the body 71. The arcuate guide 78 is a ground pin having a high tolerance diameter that is secured by a plurality of fasteners 79 through openings 91 into corresponding tapped holes 92 in the body 71. A corresponding semi-arc profile 93 machined into the body 71 that helps align the arcuate guide 78 along each face 74. Each leg includes a corresponding semi-arcuate recess 94 that encompasses more than 180 degrees for locking to each corresponding arcuate guide 78 during use. Extending from the semi-arcuate recess 94 is a tightening slit 95, for drawing and locking the semi-arcuate recess 94 tightly against the corresponding arcuate guide 78 through side fasteners 96. The side fasteners 96 pass through openings 97 on the a first side of the slit 95 into tapped holes 98 on the opposite side of the slit, drawing the slit closed and locking the guide 78 in the semi-arcuate recess 94 when tightened.

The procedure for removing a leg 75 and corresponding tool(s) 80 from the body 71 is achieved by an operator or job setter by loosening side fasteners 96 so that the tightening slit 95 is released to a state that allows the semi-arcuate recess 94 to be free enough to be lifted off the arcuate guide 78, which is fixedly attached to the body. The procedure for attaching a leg 75 and corresponding tool(s) 80 to the body 71 is achieved by sliding the semi-arcuate recess 94 over the arcuate guide 78, until the recess engages a boss 99 located on one end of the guide. Once the recess 94 is seated on the guide 78, side fasteners 96 are tightened until the semi-arcuate recess is locked to the guide.

Teaching/Compensation

There are many different frame and/or sash profiles that the cleaning station 60 must accommodate. In the prior art, each different profile required an operator to enter on a console display the profile designation so the cleaning station would know the proper sequence of movements or steps used to clean a given frame or sash of weld flash. Further teaching compensation methods are shown and described in U.S. Pat. Nos. 8,250,023 and 7,921,064, which are assigned to the assignee of the present disclosure and both patents are incorporated herein by reference in their entireties.

In accordance with the exemplary embodiment, the profile is identified automatically by a sensor or monitor S mounted at the cleaning station 60. In one embodiment the sensor S is mounted to the tool fixture arrangement 70 so that as movement of the tool brings a abrading tool into position relative the frame, the sensors S is also brought into position for examining the frame or sash 100 currently positioned at the cleaning station. To enable recognition of all available profiles, a profile training or teaching process is performed.

Each frame 100 has multiple recognition features on its outer surface. Turning to the frame depicted in FIGS. 10 and 11, in addition to the top and bottom surfaces 202 and 204, the frame includes other surfaces 206-218 all of which are likely disrupted by weld flash at the frame corners that occur during welding. In this depiction for example, the surfaces 210, 211 define outer surfaces of a nail fin for attaching the frame to the structure and the surface 206 defines a lip that overlies siding. Similarly, the surfaces 209, 208 might define surfaces for bounding a screen and the surfaces 214, 216 might define surfaces that bound a sash.

In one exemplary embodiment up to six points are located by the sensor S for each different frame 100 profile and used by the controller 35 in recognizing the profile. Once the sensors S identifies the profile of the frame member 100, the controller 35 assigns a program for that specific frame profile for the cleaning operation at the cleaning station 60 based on the finger print provided by the profile of the frame member 100. Although a laser sensor is presently preferred, video capture or tactile sensing is also contemplated for use with this disclosure.

Once the controller 35 learns the finger print of a frame member 100 profile by the sensors S, the controller 35 prompts sensors S to the points of interest that will be used to alter the cleaning process performed at the cleaning station 60. This step of adjusting the cleaning is referred to as compensation. There can be just one or many compensation points. These points will be measured every time the corresponding profile has been identified for the different shapes and geometries provided by different frame members 100. A compensation point may also simply use the data from a recognition point.

An inspection process is also implemented in the cleaning process at the cleaning station. The inspection process is performed by recording the min and max readings as the sensors S are moved across the cleaned joint between the two adjoining sides of a frame member 100. Ideally this variance is minimized by the cleaning process.

Figure 41:
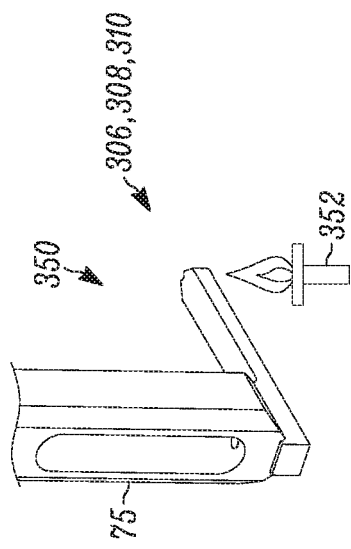
FIG. 41 illustrates another example embodiment of a heating operation.
Figure 40:
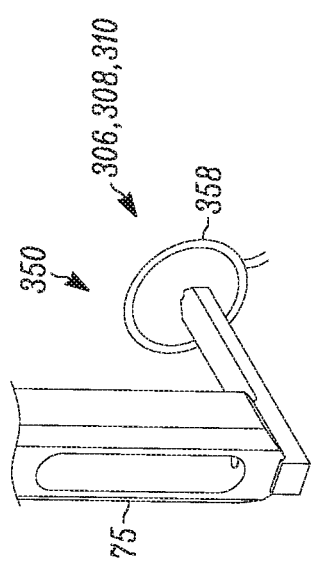
FIG. 40 illustrates one example embodiment of a heating operation.

Illustrated in FIGS. 40 and 41 are partial perspective views of a tool support fixture assembly 68 and in particular a leg 75 supporting one of shapers 308 or 310, or a knife 306. In the illustrated example embodiment of FIGS. 40 and 41, the design addresses issues relating to reducing the force and torque imposed on the articulating arm 62. High levels of force and torque for the arm assembly 62 are of particular concern on shaping and knife cutting operations on the window or frame member 100.

Testing of the arm 62 advantageously revealed that if the tool 306, 308, and 310 is heated by a heating operation 350, the force required to cut or shape the window frame 100 is reduced by a ratio of four to one 4:1. That is, a shaping operation on the frame that without heat would require on average sixty-five (65) pounds of force. By pre-heating the tool 306, 308, and 310, the required force to perform a cleaning operation such as shaping or cutting was reduced to twenty (20) pounds of force.

FIG. 40 illustrates one example embodiment of a heating operation 350 that includes induction heating of the tool 306, 308, and 310 by induction rings 358 from which the tool enters until reaching a prescribed/programmed temperature in the controller 35 as measured and transmitted to the controller by sensor S. FIG. 41 illustrates another example embodiment of a heating operation 350 that includes flame or gas heating of the tool 306, 308, and 310 by a flame 352 until the tool reaches a prescribed/programmed temperature in the controller 35 as measured and transmitted to the controller by sensor S. In one example embodiment, the tools 306, 308, and 310 are heated by a heating operation 350 until the tool temperature reaches 100 to 300 degrees Fahrenheit. It should be appreciated that the heating operation 350 could also include thermal resistive heating and the like.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. In one non-limiting embodiment the terms are defined to be within for example 10%, in another possible embodiment within 5%, in another possible embodiment within 1%, and in another possible embodiment within 0.5%. The term "coupled" as used herein is defined as connected or in contact either temporarily or permanently, although not necessarily directly and not necessarily mechanically. A device or structure that is "configured" in a certain way is configured in at least that way, but may also be configured in ways that are not listed.

To the extent that the materials for any of the foregoing embodiments or components thereof are not specified, it is to be appreciated that suitable materials would be known by one of ordinary skill in the art for the intended purposes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A window processing system for use in fabricating window frames or sashes comprising:
    a window frame support or sash support;
    an articulating arm coupled to a base positioned with respect to the window frame support or sash support, said articulating arm having a plurality of members and arms to allow movement of a tool support fixture assembly about multiple axes defined by the articulating arm;
    the tool support fixture assembly coupled to a member of said plurality of members that is an outermost member relative to the base, the tool support fixture assembly having a plurality of tools for performing cleaning operations on a window frame or sash during the cleaning operations, the window processing system further comprising a tool fixture arrangement having a body and a plurality of removable legs, each removable leg of the plurality of removable legs for coupling to a tool of the plurality of tools, the plurality of removable legs each having an arcuate recess for facilitating attachment to and removal from an arcuate guide attached to said body, wherein each of said plurality of removable legs of said tool support fixture arrangement further comprises at least one tightening slit for facilitating removal of said plurality of removable legs from said body, said at least one tightening slit extending into communication with each of the at least one arcuate recess formed in each respective removable leg.

2. The window processing system of claim 1 further comprising a controller coupled to at least one sensor, the at least one sensor identifying during operation of the window processing system the window frame or sash and initiating a cleaning operation based on the sensed identity of the window frame or sash.

3. The window processing system of claim 2 wherein said at least one sensor senses window imperfections and initiates a cleaning compensation operation of the window processing system based on window imperfections sensed by said at least one sensor.

4. The window processing system of claim 1 further comprising a frame member alignment assembly for positioning and holding a frame or sash relative to the tool support fixture assembly during the cleaning operation.

5. The window processing system of claim 1 wherein said plurality of tools comprises a saw and router.

6. The window processing system of claim 5 wherein said router and saw are coupled to a shared motor for allowing rotational operation of the saw and router during use of the window processing system.

7. An apparatus for cleaning a window frame or sash, the apparatus comprising:
a frame member for supporting the window frame or sash during cleaning;
an articulating arm coupled to a base and having a plurality of members and arms to allow selective movement of a tool support fixture about multiple axes, wherein the multiple axes are defined by at least one program;
said at least one program being stored in a programmable controller in communication with said articulating arm, said controller further being in communication with at least one sensor for identifying characteristics of a window frame or sash during use of the apparatus; and
the tool support fixture comprising a tool support body coupled to one member of the plurality of members, said one member comprising an outermost member relative to the base, the tool support fixture having a plurality of tools for performing cleaning operations on a window frame or sash during use of the apparatus, the tool support fixture further comprising a tool fixture arrangement having a body and a plurality of removable legs, each removable leg of the plurality of removable legs for coupling to a tool of the plurality of tools, the plurality of removable legs each having an arcuate recess for facilitating attachment to and removal from an arcuate guide attached to said body, wherein each of said plurality of removable legs of said tool fixture arrangement further comprises at least one tightening slit for facilitating removal of said plurality of removable legs from said body, said at least one tightening slit extending into communication with each of the at least one arcuate recess formed in each respective removable leg.

8. The apparatus of claim 7 wherein said identifying characteristics of a window frame or a sash identified by said at least one sensor during use of the articulating arm comprises identifying the type of window frame or type of window sash.

9. The apparatus of claim 8 wherein said at least one program further comprises an initiation program for the cleaning operations based on the identity of the window type identified by said at least one sensor, the initiation program having steps performed by said programmable controller.

10. The apparatus of claim 7 wherein identifying characteristics of a window frame or a sash are identified by said at least one sensor during use of the apparatus, the at least one sensor identifies imperfections in the window frame or sash.

11. The apparatus of claim 10 further comprising a compensation program stored on the programmable controller for providing instructions for the cleaning operations based on a combination of identifying imperfections in said window frame or sash by said at least one sensor and identifying the type of window frame or sash.

12. The apparatus of claim 7 wherein said at least one program operates on a non-transitory computer readable medium storing machine executable instructions processed by said controller.

13. A method for use in fabricating window frames or sashes, the method comprising the steps of:
providing an articulating arm assembly coupled to a base and rotating and translating a plurality of members and arms to move a tool support fixture assembly;
coupling the tool support fixture assembly to a member of the plurality of members that is an outermost member relative to the base, the tool support fixture assembly supporting a plurality of tools, the tool support fixture assembly further comprising a tool fixture arrangement having a body and a plurality of removable legs, each removable leg of the plurality of removable legs for coupling to a tool of the plurality of tools, the plurality of removable legs each having an arcuate recess for facilitating attachment to and removal from an arcuate guide attached to said body, wherein each of said plurality of removable legs of said tool support fixture arrangement further comprises at least one tightening slit for facilitating removal of said plurality of removable legs from said body, said at least one tightening slit extending into communication with each of the at least one arcuate recess formed in each respective removable leg; and
performing cleaning operations on a window frame or a sash by manipulating said tool support fixture assembly and supported plurality of tools by the articulating of said articulating arm assembly.

14. The method of claim 13 further comprising the step of providing a controller and coupling said controller with at least one sensor, the at least one sensor identifying the window frame or sash and the controller initiating the performing the cleaning operation based on the sensed identity of the window frame or sash.

15. The method of claim 13 further comprising the step of providing a controller and coupling said controller with at least one sensor, the at least one sensor identifying a type of window frame or type of sash and further comprising a step of identifying imperfections in the window frame or the sash such that at least one program is initiated by said controller for the performance of the cleaning operation based upon at least one of the identified type of window frame of sash and the imperfections in the window frame or the sash.

16. The method of claim 13 further comprising the step of providing a controller and coupling said controller with at least one sensor, the at least one sensor identifying a type of window frame or type of sash and further a step of identifying imperfections in the window frame or the sash such that at least one program is initiated by said controller based upon at least one of the identified type of window frame or sash and the imperfections in the window frame or the sash, said controller initiating the performance of the cleaning operation, the cleaning operation comprising execution of a compensation program comprised in the at least one program to account for any imperfections identified by the at least one sensor.

* * * * *